US010647613B2

(12) United States Patent
Espinosa et al.

(10) Patent No.: US 10,647,613 B2
(45) Date of Patent: May 12, 2020

(54) LONG-WORKABILITY CALCIUM ALUMINATE CEMENT WITH HARDENING PROMOTED BY A TEMPERATURE INCREASE, AND RELATED USE

(71) Applicant: KERNEOS, Puteaux (FR)

(72) Inventors: Bruno Espinosa, Genas (FR); Mark Winslow Fitzgerald, Humble, TX (US); Charles Walter Alt, Chesapeake, VA (US); Philippe Thouilleux, L'isle D'Abeau (FR); Ratana Soth, Lyons (FR); Michael Lievin, Veyrins-Thuellin (FR)

(73) Assignee: KERNEOS, Puteaux (FR)

( * ) Notice: Subject to any disclaimer, the term of this patent is extended or adjusted under 35 U.S.C. 154(b) by 93 days.

(21) Appl. No.: 15/744,227

(22) PCT Filed: Jul. 27, 2016

(86) PCT No.: PCT/FR2016/051948
§ 371 (c)(1),
(2) Date: Jan. 12, 2018

(87) PCT Pub. No.: WO2017/017376
PCT Pub. Date: Feb. 2, 2017

(65) Prior Publication Data
US 2018/0208510 A1    Jul. 26, 2018

(30) Foreign Application Priority Data

Jul. 27, 2015 (FR) ..................... 15 57167

(51) Int. Cl.
| | | |
|---|---|---|
| *C04B 28/06* | (2006.01) | |
| *C04B 7/32* | (2006.01) | |
| *C09K 8/46* | (2006.01) | |
| *C04B 103/00* | (2006.01) | |

(52) U.S. Cl.
CPC ............... *C04B 28/06* (2013.01); *C04B 7/32* (2013.01); *C09K 8/46* (2013.01); *C04B 2103/0012* (2013.01); *C04B 2103/0014* (2013.01); *C04B 2103/0019* (2013.01); *Y02W 30/92* (2015.05); *Y02W 30/94* (2015.05)

(58) Field of Classification Search
CPC ... C04B 7/32; C04B 28/06; C04B 2103/0012; C04B 2103/0014; C04B 2103/0019; C09K 8/46; Y02W 30/92; Y02W 30/94
See application file for complete search history.

(56) References Cited

U.S. PATENT DOCUMENTS

| | | | | |
|---|---|---|---|---|
| 4,204,878 A | * | 5/1980 | Nudelman | ................ C04B 7/32 106/693 |
| 6,143,069 A | | 11/2000 | Brothers et al. | |
| 8,992,824 B2 | * | 3/2015 | Bewlay | ................ F27D 1/0006 266/286 |
| 2004/0255822 A1 | | 12/2004 | Reddy et al. | |
| 2013/0299170 A1 | | 11/2013 | Joseph et al. | |
| 2016/0008872 A1 | * | 1/2016 | Bewlay | ................... B22C 9/043 428/544 |

FOREIGN PATENT DOCUMENTS

| | | | | |
|---|---|---|---|---|
| DE | 111672 A | * | 3/1975 | |
| EP | 2 105 419 A1 | | 9/2009 | |
| FR | 2 873 366 A1 | | 1/2006 | |
| JP | 2000-16843 A | * | 1/2000 | |
| JP | 2004-299951 A | | 10/2004 | |
| SU | 1348322 A1 | * | 10/1987 | ............. C04B 28/06 |

OTHER PUBLICATIONS

International Search Report issued in Application No. PCT/FR2016/051948, dated Sep. 19, 2016.
"Petroleum and Natural Gas Industries Cements and Materials for Well Cementing," European Standard, NF EN ISO 10426-1, Aug. 2012, ISSN 0335-3931, 51 pages.
"Petroleum and Natural Gas Industries Cements and Materials for Well Cementing," European Standard, NF EN ISO 10426-2/A1, Dec. 2005, ISSN 0335-3931, 10 pages.
"Methods for Testing Cement," European Standard, NF EN 196-6, Apr. 2012, ISSN 0335-3931, 22 pages.
"Standard Test Methods for Time of Setting of Hydraulic Cement by Vicat Needle," American Association State Highway and Transportation Officials Standard, AASHTO No. T131, ASTM C 191, 10 pages.
"Recommended Practice for Testing Well Cements," API Recommended Practice 10B-2, Apr. 2013, 122 pages.

\* cited by examiner

*Primary Examiner* — Anthony J Green
(74) *Attorney, Agent, or Firm* — Young & Thompson

(57) ABSTRACT

Disclosed is to a calcium aluminate cement, including a calcium aluminate with a first crystallised mineralogical phase of calcium dialuminate CA2 including one calcium oxide CaO for two aluminium oxides $Al_2O_3$ and/or a second crystallised mineralogical phase of dicalcium alumina silicate C2AS including two calcium oxides CaO for one aluminium oxide $Al_2O_3$ and one silicon dioxide $SiO_2$. The mass fraction of all of the first and second mineralogical phases in the calcium aluminate is greater than or equal to 80%.

18 Claims, 2 Drawing Sheets

LONG-WORKABILITY CALCIUM ALUMINATE CEMENT WITH HARDENING PROMOTED BY A TEMPERATURE INCREASE, AND RELATED USE

TECHNICAL FIELD TO WHICH THE INVENTION RELATES

This invention generally relates to the field of cements of which the hardening in the presence of water is favoured by an increase in temperature.

It relates in particular to a calcium aluminate cement comprising a calcium aluminate with a first crystallised mineralogical phase of calcium dialuminate CA2 comprising one calcium oxide CaO for two aluminium oxides $Al_2O_3$ and/or a second crystallised mineralogical phase of dicalcium alumina silicate C2AS comprising two calcium oxides CaO for one aluminium oxide $Al_2O_3$ and one silicon dioxide $SiO_2$.

It also relates to a cementitious composition comprising such a calcium aluminate cement, mixed with water and possibly with other compounds such as fly ash, a granulated blast furnace slag, a silica flour, silica fume, metakaolin, quartz, fine limestone, sand, and adjuvants.

The invention has a particularly advantageous application in any application where an increase in temperature is required or endured, such as for example the consolidating of oil wells.

TECHNOLOGICAL BACKGROUND

A cement is a mineral powder designed to be mixed with water in order to form a cementitious composition with a pasty or liquid consistency that hardens in order to form a hardened final material.

There are many cements on the market that can be distinguished, on the one hand, by their reactive properties with water, and on the other hand, by the mechanical and chemical properties of the hardened final materials that can be obtained from them.

For example, calcium aluminate cements provide the hardened final materials with specific chemical properties of high resistance to acid corrosion and mechanical properties of high resistance to high temperatures and pressures.

The reactive properties of a cement when it is mixed with water determine the workability of the cementitious composition formed by the mixture of this cement with water, i.e. the duration, also called "open time", during which this cementitious composition has a viscosity adapted to its use, namely, for example, a low viscosity in order to allow the injection thereof into cracks, or a moderate viscosity in order to allow for the shaping thereof in formworks.

These reactive properties also determine the hardening kinetics of the cementitious composition during later phases of the reaction of the cement with the water. These are in particular the characteristics of the hydraulic setting of the cementitious composition, with the hydraulic setting being an accelerated exothermic phase of the hydration reaction of the cement by the water, and of the speed at which the final hardening of the material occurs after the hydraulic setting, namely in how much time the hardened final material reaches a desired mechanical resistance.

Furthermore, it is known that a relatively high temperature, i.e. greater than about 50° C., even greater than 30° C., can accelerate the hardening kinetics of a cementitious composition, and substantially reduce its workability in particular by favouring the thickening of the cementitious composition and by triggering the hydraulic setting faster.

In order to decrease the effect of the temperature on the reactivity of the cementitious compositions, it is common to add adjuvants to the cementitious compositions, such as setting retarders.

However, as several retarders can be used in the same cementitious composition, these retarders can interact together and/or with the other additives of the cementitious composition, and it then becomes difficult to predict the hardening kinetics of this cementitious composition.

In addition, the presence of a retarder in the cementitious composition can lead to a lowering of the mechanical resistance of the hardened final material.

Moreover, it is also known that, due to these problems of workability and of hardening kinetics, cementitious compositions with a calcium aluminate base are generally manufactured on site, i.e. the water is added to the cement directly on the location of use of the cementitious compositions.

It is as such a regular occurrence that, on site, cementitious compositions with a base of calcium aluminate cements are prepared in production lines that are normally used to prepare cementitious compositions with a base of Portland cement.

As production lines comprise dead zones that are difficult to purge and/or to clean, a small amount of cement may remain from one production campaign to another. As such, during the preparation of a cementitious composition with a Portland cement base, it occurs that this Portland cement has been polluted by remainders of calcium aluminate cement, or inversely.

Yet, Portland cements and calcium aluminate cements interact with each other, and this interaction accelerates the hardening kinetics of the cementitious compositions obtained. As such, the hydraulic setting of a cementitious composition with a base of a mixture of Portland cement and of calcium aluminate cement is initiated earlier than what is expected for a cementitious composition with a base of Portland cement or of calcium aluminate cement only. When this mixture results from an involuntary pollution, the acceleration in the setting can result in blocking the installations, which is very problematic.

An application wherein generally high temperatures are involved, and for which it is essential to control the workability and the hardening kinetics of the cementitious compositions formed is the consolidating of drilling wells.

Drilling wells, and in particular oil wells, is a complex process that consists mainly in drilling the rock while introducing therein a tubular metal body.

It is known to cement the walls of drilling wells in order to reinforce the formwork of these wells and to protect the tubular body that is inserted therein from corrosion, as well as to seal this tubular body in the neighbouring rock.

To do this, industrialists use cementitious compositions in the form of aqueous suspensions commonly referred to as slurry, mainly comprising a cement, possibly aggregates or specific cementitious additions, dispersed in a relatively large quantity of water, that they inject into the tubular body to the bottom of the latter. The aqueous suspension then rises to the surface, in the space that exists between the rock wall and the tubular body.

It is then understood that the workability of the aqueous suspension must be such that this aqueous suspension can be injected to the bottom of the tubular body, and that the hydraulic setting of the aqueous suspension must occur at a controlled moment after the rising to the surface of this aqueous suspension, and this taking the underground conditions of high temperatures and pressures into account.

It is known for example from document US20130299170 complex cementitious compositions in the form of aqueous suspensions, suited for the consolidating of oil drilling wells, that include calcium aluminate cements and setting retarders comprising an organic acid and a mixture of polymers.

It is also known from documents U.S. Pat. No. 6,143,069 and US20040255822 cementitious compositions in the form of an aqueous suspension with a low density, suited for the consolidating of oil drilling wells, comprising a commercial calcium aluminate, of the brand SECAR-60™ or REFCON™, fly ash, water, retarders such as citric, gluconic or tartaric acids and other additives such as foaming agents and agents that prevent the loss of fluid.

However, the cementitious compositions formulated as such to reduce the effect of the temperature on their workability and their hardening kinetics are particularly complex. They moreover result in the use of many different chemical compounds, which can have a harmful effect on the environment.

There is therefore a need to be able to benefit from the properties provided by the hydration of calcium aluminates while still more easily controlling the period of workability in particular when the temperature is high, and tolerating a certain pollution by Portland cements or in Portland cements.

OBJECT OF THE INVENTION

In order to overcome the aforementioned disadvantages of prior art, this invention proposes a new calcium aluminate cement, that has the advantageous properties of chemical resistance and of mechanical resistance of this type of cement, as well as a naturally long open time without adding retarder, and even in the case of an involuntary mixture with Portland cements.

More particularly, according to the invention a calcium aluminate cement is proposed such as described in the introduction, wherein the mass fraction of all of said first and second mineralogical phases in said calcium aluminate is greater than or equal to 80%.

As such, thanks to these crystallised mineralogical phases, the calcium aluminate cement according to the invention has a controlled hardening kinetics, without having to add a retarder.

More precisely, the Applicant observed that the calcium aluminate cements that comprise these mineralogical phases have, at ambient temperature, an extremely long workability, and that the reactivity of these phases with water was favoured by an increase in temperature. As such, at ambient temperature, the reactivity of the calcium aluminate cement according to the invention with water is low and the kinetics of the hydration reaction is very slow. The workability of the cementitious composition with a base of this cement is therefore controlled without adding setting retarders in the form of additional chemical compounds.

Furthermore, the hardening kinetics is controlled as the hydraulic setting can be triggered and/or accelerated by an increase in temperature.

In addition, these mineralogical phases guarantee the calcium aluminate cement according to the invention with reduced interactions with Portland cements, which reduces the problems linked with the cross-contamination between Portland cements and calcium aluminate cements.

Finally, the calcium aluminate cement according to the invention has properties of mechanical resistance to high temperatures and to high pressures, and of chemical resistance to corrosion to acids similar to those of calcium aluminate cements already known in prior art.

Other non-limiting and advantageous characteristics of the calcium aluminate cement in accordance with the invention, taken individually or according to any technically permissible combination, are as follows:

said calcium aluminate also comprises an amorphous portion, of which the mass fraction in said calcium aluminate is less than or equal to 20%;

said calcium aluminate further comprises a third crystallised mineralogical phase of monocalcium aluminate CA comprising one calcium oxide CaO (noted as C according to cement-manufacturer notation) for one aluminium oxide $Al_2O_3$ (noted as A according to cement-manufacturer notation) and/or a fourth crystallised mineralogical phase of hexacalcium aluminate CA6 comprising one calcium oxide CaO for six aluminium oxides $Al_2O_3$, the mass fraction of all of the third and fourth mineralogical phases in said calcium aluminate being less than or equal to 20%;

said calcium aluminate further comprises an additional mineralogical phase of sulfocalcium aluminate C4A3$ comprising four calcium oxides CaO for three aluminium oxides $Al_2O_3$ and one sulphur oxide $SO_3$ (noted as $ according to cement-manufacturer notation);

it comprises, by weight with respect to the total weight of said calcium aluminate: 0% to 5% of an iron oxide $Fe_2O_3$, 0% to 5% of a titanium oxide $TiO_2$, 0% to 5% of a sulphur oxide $SO_3$, 0% to 5% of a magnesium oxide MgO, 0% to 2% of alkaline compounds;

it has the form of a powder that has a Blaine specific surface area measured according to standard NF-EN-196-6 ranging between 2200 square centimetres per gram and 4500 square centimetres per gram, preferably between 2900 and 3900 square centimetres per gram;

it comprises, by weight with respect to the total weight of said calcium aluminate: 50% to 60% of first crystallised mineralogical phase CA2, 26% to 32% of second crystallised mineralogical phase C2AS (S designating the silica $SiO_2$ according to cement-manufacturer notation), 2.5% to 3.5% of third crystallised mineralogical phase CA, 0.5% to 1.5% of a fifth crystallised mineralogical phase of tetracalcium ferro-aluminate C4AF (F designating the iron oxide $Fe_2O_3$ according to cement-manufacturer notation), 10% to 15% of additional crystallised mineralogical phases;

the calcium aluminate cement according to the invention comprises from 0.5% to 15% of additional mineralogical phase of sulfocalcium aluminate C4A3$, by weight with respect to the total weight of said calcium aluminate.

The invention also proposes a cementitious composition comprising at least the calcium aluminate cement according to the invention mixed with water, and possibly cementitious additions such as fly ash and/or a granulated blast furnace slag and/or a silica flour and/or silica fume and/or metakaolin, granulates such as quartz and/or fine limestone and/or sand, and adjuvants.

The invention also proposes a use of the calcium aluminate cement such as described hereinabove, according to which a) a cementitious composition is realised by mixing at least said calcium aluminate cement with water, b) said cementitious composition is set in place, c) said cementitious composition is heated to a temperature ranging between 50° C. and 300° C., preferably between 80° C. and 280° C., in such a way as to favour the setting of the cementitious composition.

The cementitious composition can further comprise aggregates (for example sand) and/or adjuvants (for example retarders, accelerators or other) known to those skilled in the art.

In the temperature conditions of the step c), the pressure is preferentially chosen to be high, i.e. greater than or equal to saturation vapour pressure, in such a way that the water is present in liquid form or at least in the form of saturation vapour.

In particular, this use of the calcium aluminate cement has a particularly advantageous application in consolidating drilling wells, and in particular oil drilling wells.

For this, in step a) of the use according to the invention, the cementitious composition is in the form of an aqueous suspension, and in step b), the cementitious composition is placed in an oil drilling well.

DETAILED DESCRIPTION OF AN EMBODIMENT

Figure 1:
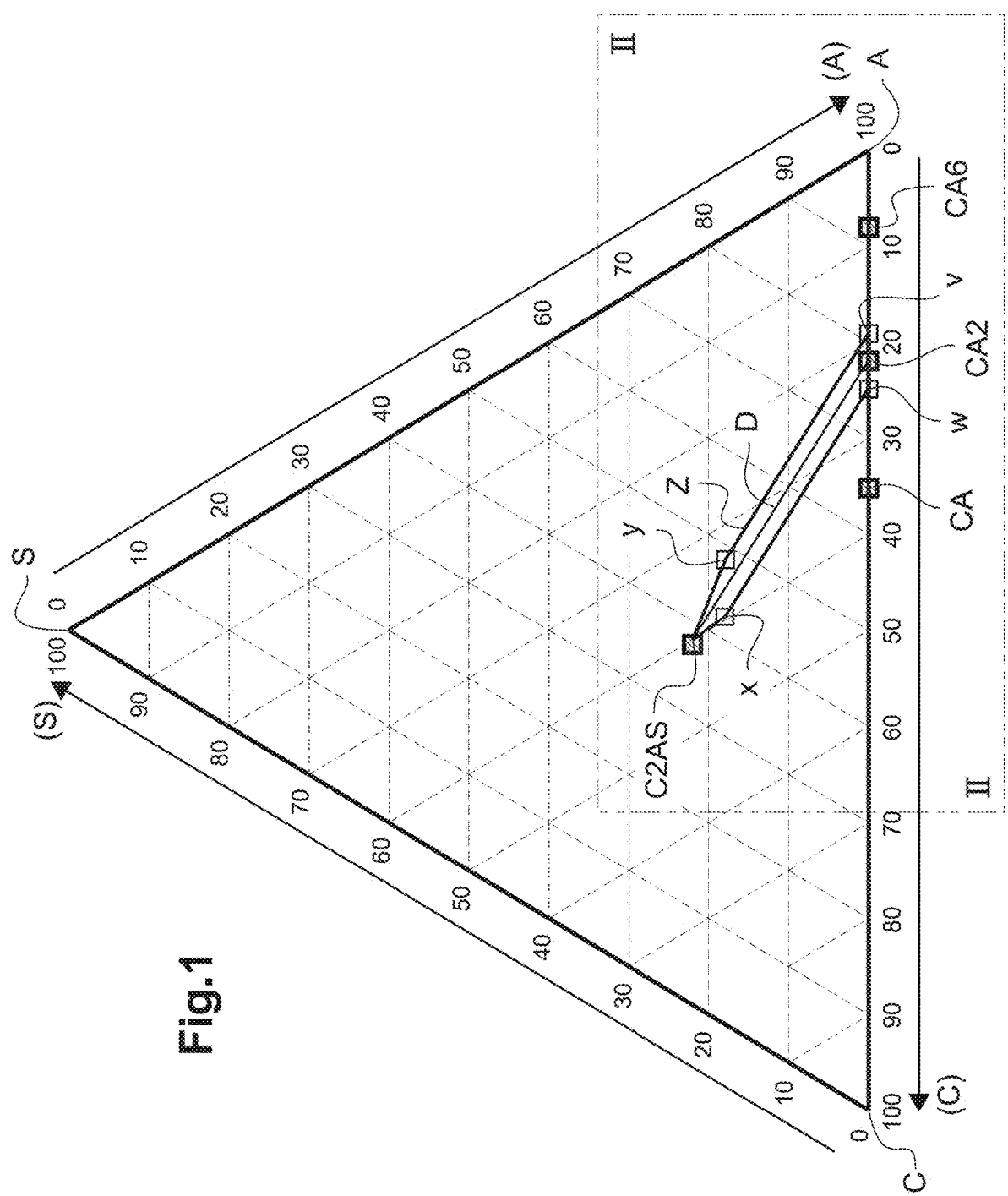
FIG. 1 is a ternary lime-alumina-silica diagram, represented in mass fraction of lime, alumina and silica.

The following description with regards to the annexed drawings, provided as non-limiting examples, shall explain what the invention consists of and how it can be realised.

In the invention, and unless specified otherwise, the indication of an interval of values "X to Y" or "between X and Y", in this invention, is to be understood as including the values X and Y.

This invention relates to a calcium aluminate cement adapted to be mixed with water in order to form a cementitious composition of which the workability is naturally long, and of which the reactivity is favoured by an increase in temperature.

In the rest of the description, the term "cement" shall designate a powder designed to be mixed with water in order to form a cementitious composition that is able to harden in order to form a hard final material.

The term "cementitious composition" shall designate the mixture of the cement with water and possibly with other additional compounds.

Finally, as shall be explained well in what follows, the "reactivity" or the "reactive properties" of the cement characterise the capacity of this cement to react with water.

From a chemical point of view, the calcium aluminate cement according to the invention comprises at least one calcium aluminate, i.e. a compound comprising both calcium oxide and aluminium oxide.

More precisely, here, the calcium aluminate of the cement according to the invention comprises calcium oxide commonly referred to as lime CaO, aluminium oxide commonly referred to as alumina $Al_2O_3$, and silicon dioxide commonly referred to as silica $SiO_2$.

In such a way as to lighten the notations, as is conventionally done by cement-manufacturers in their notations, we shall shorten in what follows lime CaO by the letter C, alumina $Al_2O_3$ by the letter A and silica $SiO_2$ by the letter S.

These three compounds, namely lime C, alumina A and silica S, constitute the majority compounds present in the calcium aluminate according to the invention.

The calcium aluminate according to the invention can also comprise, by weight with respect to the total weight of said calcium aluminate:

0% to 5% of an iron oxide $Fe_2O_3$ (shortened to F according to cement-manufacturer notation), 0% to 5% of a titanium oxide $TiO_2$ (shortened to T according to cement-manufacturer notation), 0% to 5% of a sulphur oxide $SO_3$ (shortened to $ according to cement-manufacturer notation), 0% to 5% of a magnesium oxide MgO (shortened to M according to cement-manufacturer notation), 0% to 2% of alkaline compounds.

These other compounds are minority compounds of the calcium aluminate of the cement according to the invention. They constitute impurities that generally come from raw materials used for the manufacture of the calcium aluminate.

From a mineralogical point of view, the calcium aluminate cement according to the invention comprises a crystalline portion and an amorphous portion.

These crystalline and amorphous portions characterise the microscopic state of the calcium aluminate cement according to the invention: the crystalline portion of this calcium aluminate cement comprises atoms and/or molecules ordered according to a particular geometry, in crystallised mineralogical phases, while the amorphous portion of this calcium aluminate cement comprises atoms and/or molecules that are arranged in a disorderly manner in relation to one another, i.e. without any particular order.

Here, the calcium aluminate of the cement according to the invention is primarily crystalline.

More precisely, advantageously, in the calcium aluminate cement according to the invention, the mass fraction of said crystalline portion in said calcium aluminate is greater than or equal to 80%.

In other words, the mass of the crystalline portion in relation to the total weight of the calcium aluminate of the cement according to the invention, is greater than or equal to 80%.

As such, in the calcium aluminate cement according to the invention, the mass fraction of the amorphous portion is less than or equal to 20%.

The crystalline portion has crystallised mineralogical phases which make it possible to more specifically describe the calcium aluminate of the cement according to the invention.

Indeed, the quantity and the nature of the crystallised mineralogical phases present in the cement according to the invention account for the chemical composition of said calcium aluminate.

In the rest of the description, these "crystallised mineralogical phases" shall sometimes be referred to as "mineralogical phases".

Here in particular, the crystallised mineralogical phases describe both the structure on the atomic scale and the chemical composition of the calcium aluminate, insofar they involve several different compounds.

In particular, here, the mineralogical phases of the calcium aluminate of the cement according to the invention involve lime C, alumina A and silica S.

Generally, the crystallised mineralogical phases of calcium aluminates are numerous. Among them, the following can be mentioned:

phases that comprise only lime C and alumina A, such that:
  the phase of monocalcium aluminate $CaAl_2O_4$ noted as CA, of which the crystalline lattice comprises one molecule of lime C for one molecule of alumina A,
  the phase of monocalcium dialuminate $CaAl_4O_7$ noted as CA2, of which the crystalline lattice comprises one molecule of lime C for two molecules of alumina A,
  the phase of monocalcium hexa-aluminate noted as CA6, of which the crystalline lattice comprises one molecule of lime C for six molecules of alumina A,
  the phase of tricalcium aluminate noted as C3A, of which the crystalline lattice comprises three molecules of lime C for one molecule of alumina A,
  the phase of dodecacalcium hepta-aluminate noted as C12A7, of which the crystalline lattice comprises two molecules of lime C for seven molecules of alumina A;
phases that comprise only lime C and silica S, such that:
  the phase of monocalcium silicate noted as CS, of which the crystalline lattice comprises one molecule of lime C for one molecule of silica S;
  the phase of dicalcium silicate noted as C2S, of which the crystalline lattice comprises two molecules of lime C for one molecule of silica S,
  the phase of tricalcium silicate noted as C3S, of which the crystalline lattice comprises three molecules of lime C for one molecule of silica S;
  the phase of tricalcium bisilicate noted as C3S2, of which the crystalline lattice comprises three molecules of lime C for two molecules of silica S;
phases that comprise only alumina A and silica S, such that:
  the phase of tri-aluminate bisilicate noted as A3S2, of which the crystalline lattice comprises three molecules of alumina A for two molecules of silica S;
phases comprising lime C, alumina A and silica S, such that:
  the phase of dicalcium alumina silicate noted as C2AS, of which the crystalline lattice comprises two molecules of lime C for one molecule of alumina A and one molecule of silica S,
  the phase of monocalcium alumina bisilicate noted as CAS2, of which the crystalline lattice comprises one molecule of lime C for one molecule of alumina A and two molecules of silica S;
  this list being not a complete list.

These mineralogical phases are generally chosen according to the properties that they provide the calcium aluminate cement with, in particular in terms of reactivity and of mechanical property of the hardened final material.

It is common to graphically represent in a ternary diagram the various mineralogical phases that a calcium aluminate can adopt according to the relative proportion of each one of the three compounds lime C, alumina A and silica S in said calcium aluminate.

Such a ternary diagram is shown in FIG. 1 which shows some of the different mineralogical phases that can coexist in a calcium aluminate, according to the mass proportion of lime C, of alumina A and of silica S contained in said calcium aluminate.

In this diagram, it is possible to read the mass fraction of lime C contained in the calcium aluminate on the side of the triangle located between the vertices A and C, the mass fraction designating the weight of the lime C contained in the calcium aluminate with respect to the total weight of lime C, of alumina A and of silica S contained in said calcium aluminate.

This mass fraction of lime C is located inside the ternary diagram all along a line parallel to the side of the triangle opposite the vertex C.

Similarly, it is possible to read the mass fraction of alumina A contained in the calcium aluminate on the side of the triangle located between the vertices S and A, and this mass fraction of alumina A is located inside the ternary diagram all along the line parallel to the side of the triangle opposite the vertex A.

Likewise, the mass fraction of silica S contained in the calcium aluminate on the side of the triangle located between the vertices C and S, and this mass fraction of silica S is located inside the ternary diagram all along the line parallel to the side of the triangle opposite the vertex S.

Furthermore, in the ternary diagram, particular points appear that represent pure mineralogical phases. In other words, if the composition of the crystalline portion of the calcium aluminate corresponds exactly to the molar fraction of lime C, of alumina A and of silica S of this particular point, then said crystalline portion of the calcium aluminate comprises 100% of this particular crystallised mineralogical phase. This is the case for example on point C2AS, or point CA or points CA2 or CA6.

In practice, it is rare for the calcium aluminate to comprise a single pure phase, it more generally comprises several phases that coexist. Here, in the calcium aluminate according to the invention, the majority crystallised mineralogical phases are as follows:
  the phase CA2, referred to as first crystallised mineralogical phase,
  the phase C2AS, referred to as second crystallised mineralogical phase.

More particularly, remarkably, the mass fraction of all of said first and second mineralogical phases CA2, C2AS in said calcium aluminate is greater than or equal to 80%.

In other words, the cumulative weight of the first and second mineralogical phases CA2, C2AS represents at least 80% of the total weight of the calcium aluminate of the cement of calcium aluminates according to the invention.

As such, contrary to the calcium aluminates described in prior art, of which the majority mineralogical phase is the phase CA, here, the majority mineralogical phase or phases are the first and second mineralogical phases CA2, C2AS.

The remaining 20% of the calcium aluminate of the cement according to the invention, by weight with respect to the total weight of said calcium aluminate, can include minority mineralogical phases such as:
  the phase CA, referred to as third crystallised mineralogical phase, and
  the phase CA6, referred to as fourth crystallised mineralogical phase.

Figure 2:
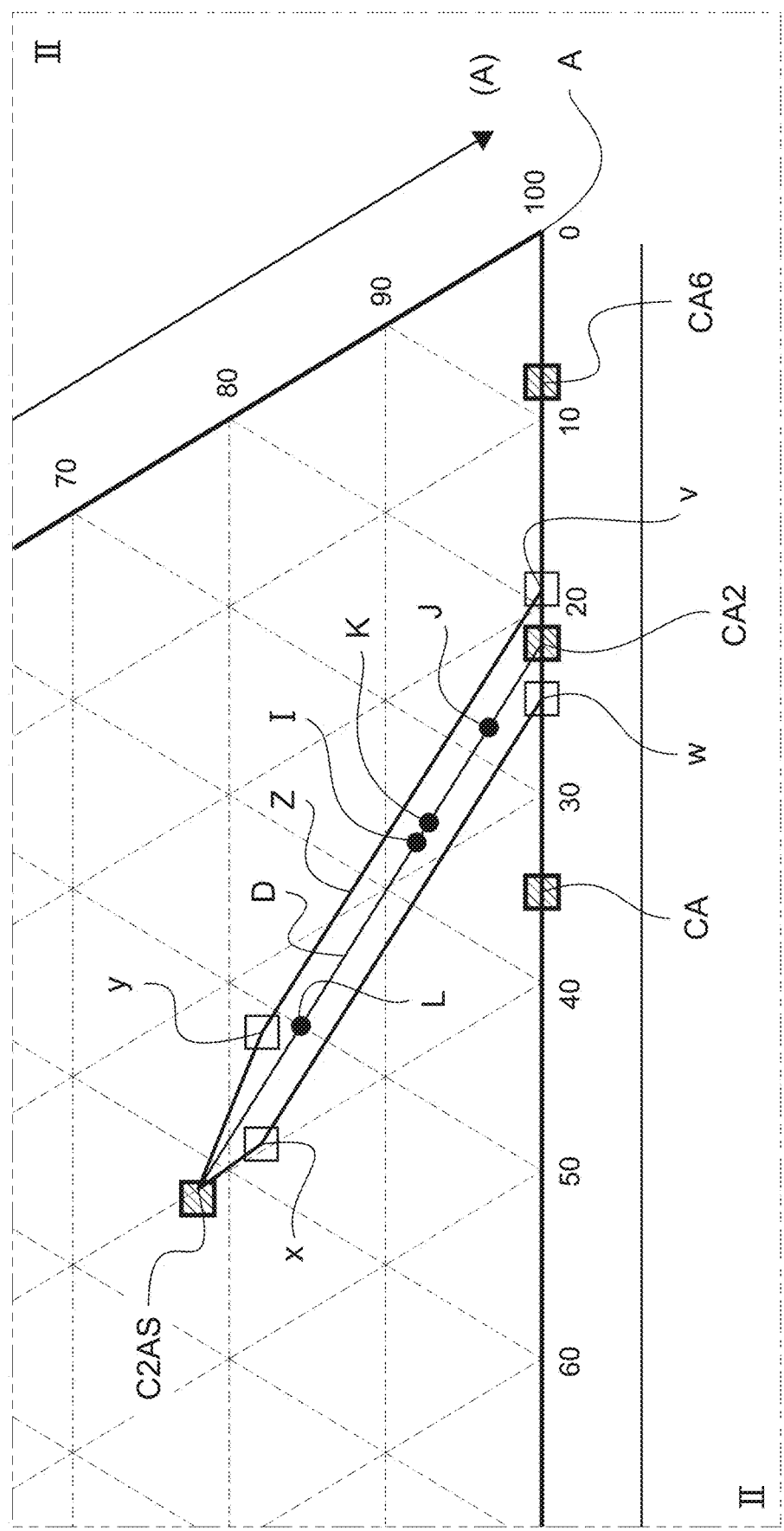
FIG. 2 is a zoom of FIG. 1 in the area of interest [II-II] in order to describe the range of composition of the calcium aluminate according to the invention.

Indeed, as shown in the ternary diagram of FIGS. 1 and 2, these third and fourth mineralogical phases CA, CA6 are located in the immediate vicinity of the first and second mineralogical phases CA2, C2AS, in such a way that, during the manufacture of the calcium aluminate of the cement according to the invention, it is very likely to form these third and fourth mineralogical phases CA, CA6.

Preferably, the mass fraction of all of the third and fourth crystallised mineralogical phases CA, CA6 in said calcium aluminate of the calcium aluminate cement according to the invention is less than or equal to 20%.

The remaining 20% of the calcium aluminate of the cement according to the invention can also include the minority compounds that constitute the impurities of the calcium aluminate according to the invention mentioned hereinabove: iron oxide $Fe_2O_3$ (F), titanium oxide $TiO_2$ (T), sulphur oxide $SO_3$ ($), magnesium oxide MgO, or alkaline compounds.

In particular, the minority compounds can form mineralogical phases with at least one of the majority compounds of the calcium aluminate which are alumina A, lime C and silica S.

In particular, the remaining 20% of the calcium aluminate of the calcium aluminate cement according to the invention can include an additional mineralogical phase of sulfocalcium aluminate C4A3$ comprising four calcium oxides CaO for three aluminium oxides $Al_2O_3$ and one sulphur oxide $SO_3$.

This additional mineralogical phase C4A3$ having a crystalline lattice comprising four molecules of lime C for three molecules of alumina A and one molecule of sulphur oxide $ is also called Ye'elimite.

The calcium aluminate cement according to the invention can thus include 0.5% to 15%, preferably from 0.5% to 12%, of this additional mineralogical phase of sulfocalcium aluminate C4A3$, by weight with respect to the total weight of said calcium aluminate.

Advantageously, the minority phase Ye'elimite has an effect on the reactivity of the cementitious composition. In particular, the more the proportion of the minority phase Ye'elimite C4A3$ increases in the cementitious composition, the more the viscosity, at ambient temperature, of this cementitious composition increases. This effect is even more pronounced when the temperature around the cementitious composition increases.

The minority phase Ye'elimite also has an effect on the reactivity of the cementitious composition at high temperature. In particular the more the proportion of the minority phase Ye'elimite C4A3$ increases in the cementitious composition, the more the setting time is extended at high temperature.

In the framework of the manufacture of a cement suited for an application in oil well drilling, choosing a composition of calcium aluminate that comprises a non-zero proportion of the minority phase Ye'elimite seems particularly advantageous. In particular, a proportion between 3 and 5%, for example equal to 3%, 4% or 5% of the phase Ye'elimite C4A3$ is appropriate.

This remaining 20% also includes the amorphous portion of the calcium aluminate of the cement according to the invention, if one exists.

In the ternary diagram of FIGS. 1 and 2, there is a particular straight line D that connects the particular points that represent the first and second mineralogical phases CA2, C2AS.

If the calcium aluminate of the cement according to the invention belongs to this particular straight line D, then it comprises between 100% of first mineralogical phase CA2 and 100% of second mineralogical phase C2AS.

In other words, if the calcium aluminate of the cement according to the invention belongs to this particular straight line D, this calcium aluminate is crystalline, and the mass fraction of all of said first and second mineralogical phases CA2, C2AS in the calcium aluminate of the cement according to the invention is equal to 100%.

Thus, in order for the mass fraction of all of said first and second mineralogical phases CA2, C2AS in said calcium aluminate to be greater than or equal to 80%, this calcium aluminate must be located in a zone Z close to this particular straight line D.

This zone Z is shown graphically in the FIGS. 1 and 2. The points v, w, x and y of the figures correspond to the following mineralogical compositions:

the point v comprises 80% of first mineralogical phase CA2 and 20% of fourth mineralogical phase CA6, the point w comprises 80% of first mineralogical phase CA2 and 20% of third mineralogical phase CA, the point x comprises 80% of second mineralogical phase C2AS and 20% of third mineralogical phase CA, and the point y comprises 80% of first mineralogical phase C2AS and 20% of fourth mineralogical phase CA6.

Thus, the surface of the ternary diagram delimited by the contour that connects the points [v-CA2-w-x-C2AS-y-v] corresponds to the zone Z inside of which the sum of the first and second phases CA2, C2AS is greater than or equal to 80%.

Furthermore, it is possible to retrieve the chemical composition of a calcium aluminate by knowing its position in the ternary diagram.

For example, the composition of the point Y of the ternary diagram of FIGS. 1 and 2 is 34.4% in lime C, 48.1% in alumina A, and 17.5% in silica S.

Thus, according to the same principle, the ranges of the chemical composition in line C, in alumina A and in silica S of any calcium aluminate that belong to the zone Z can also be determined graphically on the ternary diagram using FIG. 2.

Of course, when minority compounds are present in the calcium aluminate, it is still possible to position this calcium aluminate in the ternary diagram by determining the relative proportions of lime C, of alumina A and of silica S in relation to the total weight of lime C, alumina A and silica S comprised in this calcium aluminate.

Moreover, surprisingly, the first and second mineralogical phases CA2, C2AS have a particular reactivity when they are in the presence of water.

Indeed, these first and second mineralogical phases CA2, C2AS react very little with water at ambient temperature. In other terms, they are adapted to react very slowly with water at ambient temperature.

It is understood here that a mineralogical phase reacts with water when it is hydrated by the water, and it is possible to characterise this reactivity with a magnitude called "degree of hydration" of the mineralogical phase.

The degree of hydration translates the capacity of a mineralogical phase to be hydrated by water, i.e. that the molecules that constitute the crystalline lattice of said mineralogical phase pass into solution in the water in the form of ions, in other words the degree of hydration assesses the ability of the bonds that exist between the molecules that constitute the mineralogical phase to be broken by the interaction with water.

Nevertheless, as shall be demonstrated in the examples, the first and second mineralogical phases CA2, C2AS are adapted to react efficiently with water under the effect of an increase in temperature.

In other words, the degree of hydration of these first and second mineralogical phases increases with the temperature.

In particular, these first and second mineralogical phases CA2, C2AS are able to react with water much more quickly when the cure temperature is between 50 degrees Celsius (° C.) and 300° C., preferably between 80° C. and 280° C. than at ambient temperature.

Advantageously, it is furthermore possible to adjust the relative quantity of each one of first and second mineralogical phases CA2, C2AS comprised in the calcium aluminate cement according to the invention in order to adjust the reactivity of the calcium aluminate cement according to the invention at this temperature, starting from the degree of hydration of the first and second crystallised mineralogical phases CA2, C2AS at a given temperature.

Contrary to the first and second mineralogical phases CA2, C2AS, the third mineralogical phase CA is known to be very reactive at ambient temperature when it is in the presence of water, that is why its mass fraction in the calcium aluminate of the cement according to the invention is maintained less than or equal to 20% in such a way as to maintain the characteristics of long workability of the cement according to the invention.

The fourth mineralogical phase CA6 is entirely inert regardless of the temperature to which it is subjected, ambient or high. As such, it is not hydrated even during an increase in temperature.

On the other hand, when it is present in the calcium aluminate, it contributes substantially to the high cost of production of said calcium aluminate as it contains a lot of alumina which is the most expensive portion of said calcium aluminate. That is why its mass fraction in the calcium aluminate of the cement according to the invention is maintained less than or equal to 20%.

Thus, very advantageously, as the cement according to the invention comprises little of these third and fourth phases CA, CA6, it reacts slowly when it is mixed with water at ambient temperature, without needing to add a retarder, and it is advantageous from an economic point of view.

For example, a calcium aluminate cement according to the invention that is particularly interesting, comprises, by weight with respect to the total weight of said calcium aluminate:

50% to 60% of first crystallised mineralogical phase CA2;
26% to 32% of second crystallised mineralogical phase C2AS;
2.5% to 3.5% of third crystallised mineralogical phase CA;
0.5% to 1.5% of a fifth crystallised mineralogical phase of tetracalcium ferro-aluminate C4AF;
10% to 15% of additional crystallised mineralogical phases.

As such, this composition according to the invention has both a majority of first and second crystallised mineralogical phases CA2, C2AS and a minority of crystallised mineralogical phases CA, CA6.

More precisely, an example of calcium aluminate cement according to the invention that can be considered comprises exactly, by weight with respect to the total weight of said calcium aluminate:

55% of first crystallised mineralogical phase CA2;
29% of second crystallised mineralogical phase C2AS;
3% of third crystallised mineralogical phase CA;
1% of a fifth crystallised mineralogical phase of tetracalcium ferro-aluminate C4AF;
12% of additional crystallised mineralogical phases.

The additional crystallised mineralogical phases include in particular for example the phase Ye'elimite C4A3$. This example of calcium aluminate cement according to the invention comprises for example, by weight with respect to the total weight of said calcium aluminate between 0.5% and 12% of this phase Ye'elimite C4A3$.

More precisely, in the example given hereinabove, the calcium aluminate cement comprises for example 4% of this phase Ye'elimite, comprised in the 12% of additional crystallised mineralogical phases.

In the diagram of FIG. 2, this particular composition is found at point I. It is very close to the particular straight line D and even appears to belong to this particular straight line D in FIG. 2.

Moreover, in order to manufacture the calcium aluminate cement according to the invention, an operator co-grinds, i.e. mixes and grinds in a single operation, bauxite and limestone until a powder is obtained that comprises particles of which the maximum diameter is less than or equal to 100 micrometres (μm).

The co-grinding operation can be carried out using a ball mill or any other mill known to those skilled in the art.

The powder obtained at the end of this co-grinding operation is then granulated with water, i.e. the fine particles of powder are agglomerated thanks to the water in order to form granules of a diameter exceeding that of the powder.

These granules are then introduced into a crucible made of alumina which is itself introduced into an electric oven. The electric oven containing the crucible is brought to a temperature of 1400° C. according to a temperature gradient of 600° C. per hour. When the oven has reached 1400° C., a cooking stage of 6 hours is applied.

At the output of the electric oven, the granules of calcium aluminate are ground finely in order to form the powder that forms the calcium aluminate cement according to the invention.

Advantageously, the calcium aluminate cement powder according to the invention has a Blaine specific surface area measured according to standard NF-EN-196-6, between 2200 square centimetres per gram and 4500 square centimetres per gram.

Preferably, the Blaine specific surface area of the calcium aluminate cement according to the invention is between 2900 and 3900 square centimetres per gram.

The higher the Blaine specific surface area is, the finer the grains constituting the powder are.

Furthermore, advantageously, the cement according to the invention having such a Blaine specific surface area is adapted during its mixing with water, to have an optimal contact surface with this water.

Furthermore, the cement according to the invention having this Blaine specific surface area is adapted to be mixed homogeneously with a large quantity of water, i.e. the cement is adapted to be dispersed in a large quantity of water equivalently at all points of the mixture.

In other words, even in the presence of a substantial quantity of water, the cement according to the invention does not bleed.

The calcium aluminate cement according to the invention can be mixed with water in order to form a cementitious composition.

More precisely, the cementitious composition according to the invention can include compounds other than the calcium aluminate cement according to the invention, such as:

cementitious additions chosen from: fly ash and/or a granulated blast furnace slag and/or a silica flour and/or silica fume and/or metakaolin,
granulates with more or less large diameters chosen from: quartz and/or fine limestone and/or sand, and
adjuvants of any kind known to those skilled in the art, for example thinning agents or setting retarders.

These lists of other compounds possibly contained in the cementitious composition are not limiting.

Fly ash corresponds to the ashes obtained during the combustion at high pressures and temperatures of the pulverised coal.

Very fine fly ash referred to as pulverised fly ash or fly ash with larger dimensions referred to as furnace bottom ash can in particular be added. The commercial products EN4750 "N" fly ash® from the company Scotash, or class F bottom ash® from the company FlyAshDirect are examples of these.

Table 1 hereinbelow gives the main physical-chemical characteristics of these fly ashes.

TABLE 1

| Fly Ash | EN450"N" fly ash | Class F bottom ash |
|---|---|---|
| Company | Scotash | FlyAshDirect |
| Blaine Specific Surface Area ($cm^2/g$) | 3110 | 2000 |
| d50 (μm) | 14.0 | 23.1 |
| Density | 2.27 | 2.49 |
| LOI 1000° C. (%) | 4.8 | na |

Here, the LOI (Loss on Ignition) groups together volatile elements.

The granulated blast furnace slag come from the surface layer that is formed during the fusion of the iron in blast furnaces, said surface layer being separated from the iron in fusion and then cooled in the form of granules in order to form said slag.

The commercial product Slag® from the company Ecocem is an example of this.

Table 2 hereinbelow gives the main physical-chemical characteristics of this slag.

TABLE 2

| Slag | Slag |
|---|---|
| Company | Ecocem |
| Blaine Specific Surface Area ($cm^2/g$) | 4500 |
| d50 (μm) | 12.7 |
| Density | 2.93 |

The silica fume is a pozzolanic material comprising amorphous silica. It is generally a secondary product from the production of alloys of silicon and/or of ferrosilicon in electric arc furnaces. It can have different aspects: it can it particular be found in the form of very fine powder, or hard granules of a few millimetres in diameter.

The commercial products 971U® from the company Elkem and Dray Powder S® from the company Norchem are examples of this.

Table 3 hereinbelow gives the main physico-chemical characteristics of these silica fumes.

TABLE 3

| Silica fume | 971U | Dry Powder S |
|---|---|---|
| Company | Elkem | Norchem |
| Blaine Specific Surface Area ($cm^2/g$) | 16400 | 1640 |
| d50 (μm) | 10.3 | ~560 |
| Density | 2.24 | 2.29 |

The metakaolin is an anhydrous and slightly crystalline aluminium silicate produced by dehydroxylation of the kaolin at high temperatures.

The commercial product Metasial V800® from the company Soka (Kaolinière Armoricaine Company) is an example of this.

Table 4 hereinbelow gives the main physico-chemical characteristics of this metakaolin.

TABLE 4

| Metakaolin | Metasial V800 |
|---|---|
| Company | Soka |
| Blaine specific surface area ($cm^2/g$) | 14100 |
| d50 (μm) | 4.0 |
| Density | 2.75 |

In practice, the cementitious composition can for example include:
from 0% to 50% of cementitious additions, by weight with respect to the dry weight of the cementitious composition, and/or
from 50% to 100% of calcium aluminate cement according to the invention, by weight with respect to the dry weight of the cementitious composition;
the dry weight of the cementitious composition corresponding to the total weight of all of the compounds comprised in said cementitious composition except water.

Thus, the cementitious composition can for example include 0%, 5%, 10%, 15%, 20%, 25%, 30%, 35%, 40%, 45% or 50% of cementitious additions, by weight with respect to the dry weight of the cementitious composition, and/or 50%, 55%, 60%, 65%, 70%, 75%, 80%, 85%, 90%, 95% or 100% of calcium aluminate cement according to the invention, by weight with respect to the dry weight of the cementitious composition.

Regardless of the compounds comprised in the cementitious composition, the calcium aluminate cement present reacts with the water, i.e. a chemical reaction is produced, commonly called "hydration", between the calcium aluminate cement and the water, during which the molecules constituting the crystalline and/or amorphous portions of the cement according to the invention are hydrated by the water, namely they pass into solution in the water in the form of ions.

Conventionally, due to this chemical reaction, the consistency of the cementitious composition formed by the mixture between the water and the cement according to the invention is able to change over time.

More precisely, three phases of change in said cementitious composition can be detected, with these three phases constituting the "global hardening" of the cementitious composition:
a first phase, referred to as thickening phase, during which the viscosity of the cementitious composition increases slowly, without preventing the implementation thereof;
a second phase, referred to as setting phase or hydraulic setting phase, during which the cementitious composition hardens quickly; and,
a third phase, referred to as the final hardening phase, during which the cementitious composition continues to harden more slowly.

The duration of the thickening phase can vary from one cement to another in that it greatly depends on the reactivity of the cement used.

The open time globally corresponds to the duration of this thickening phase. It is about a few hours in general.

In practice, the duration of the thickening phase can vary from a few minutes to a few hours according to the application considered, the cement and the adjuvants that are possibly added.

In the case of an application in oil wells, the thickening phase generally lasts a few hours.

The duration of the thickening phase also depends on external parameters such as the pressure, temperature, and the relative proportion between the water and the cement.

During the hydraulic setting phase, the cementitious composition passes rapidly from a liquid state to a solid state, with these states being defined in the mechanical sense of the term, namely that the liquid state is a state wherein the cementitious composition is irreversibly deformed when it is subjected to a deformation, while the solid state is a state wherein the cementitious composition can be deformed elastically when it is subjected to a deformation.

In practice, it is considered that the cementitious composition has reached its solid state when, subjected to the Vicat test according to the ASTM C91 standard described hereinafter in the example part, the Vicat needle is unable to fully pass through the cementitious composition. On the contrary, it is considered that the cementitious composition is in its liquid state when, subjected to this same Vicat test, the Vicat needle passes fully through the cementitious composition.

As such, at the end of the hydraulic setting phase, the cementitious composition already has a hardened aspect, in such a way that it can be considered as a hardened final material. However, it continues to harden during the final hardening phase.

In practice, here, the invention proposes a use of the calcium aluminate cement according to the invention, according to which a) a cementitious composition is realised by mixing said calcium aluminate cement with water, b) said cementitious composition is put in place, c) said cementitious composition is heated to a temperature between 50° C. and 300° C., preferably between 80° C. and 280° C., in such a way as to favour the setting of the cementitious composition.

In step a), a user forms the cementitious composition by mixing the calcium aluminate cement with all of the said other compounds possibly comprised in the cementitious composition, and with water.

Initially, i.e. at the time when the water, the cement and possibly said other compounds are mixed, the consistency of the cementitious composition formed is more or less fluid according to the weight of the water that it contains in relation to the total weight of said cementitious composition.

The quantity of water added to the cement according to the invention and to said possible other compounds mainly depends on the application for which the cementitious composition is intended.

For example, a user can choose to form a cementitious composition in the form of a rather non-fluid paste.

According to a particular use of the calcium aluminate cement according to the invention, in step a), the user can form an aqueous suspension of cement.

More precisely, in the case where the cementitious composition is an aqueous suspension exclusively formed by water and the cement according to the invention, the mass fraction of the water in said aqueous suspension is between 15% and 45%.

The mass fraction of the water in this aqueous suspension, comprised between 15% and 45%, amounts to a water/cement ratio comprised between 20% and 70%, said ratio being the ratio between the weight of the water and the weight of the dry cement forming the aqueous suspension.

In the case where the cementitious composition is an aqueous suspension and comprises water, the calcium aluminate cement according to the invention and cementitious additions, the mass fraction of the water in said aqueous suspension is between 20% and 60%, for example equal to 29%, 31%, 33%, 37%, 52%, or 55%.

The mass fraction of the water in this aqueous suspension, comprised between 20% and 60%, amounts to a water/dry compound ratio between 25% and 150%, said ratio being the ratio between the weight of the water and the dry weight of the cementitious composition that comprises the cement and the cementitious additions. For example, the water/dry compound ratio of the aqueous suspension is equal to 41%, 48%, 60%, 80%, 110%, or 120%.

These general considerations are known to those skilled in the art and the proportion of water to be added to the cement and to the possible other compounds in order to obtain a cementitious composition of which the consistency is adapted to each type of application shall not be discussed hereinafter in any further detail.

In step b), as long as the cementitious composition is in the thickening phase, the user can set the cementitious composition in place.

For example, if the cementitious composition has the form of an aqueous suspension, the user can pour the cementitious composition into a slot.

In particular, according to the particular use of the calcium aluminate cement according to the invention in the form of an aqueous suspension, in step b), said aqueous suspension is injected into an oil drilling well.

This injection is carried out by means of one or several pumps that push the aqueous suspension into a tubular body to the bottom of the drilling well. Once it arrives at the bottom of this drilling well, this suspension can naturally move back up to the surface, between the rock wall and the tubular body.

When the cementitious composition is in the form of a paste, the user can shape it in such a way as to pre-fabricate objects of the beam or slab type.

In step c), the triggering of the hydraulic setting phase of the cementitious composition is favoured by a heating of the cementitious composition to a temperature between 50° C. and 300° C., preferably between 80° C. and 280° C.

More precisely, this heating of the cementitious composition can be voluntary or be endured.

Thus, in practice, according to the particular use of the cementitious composition in the form of an aqueous suspension for oil drilling wells, this aqueous suspension of cement is naturally heated between 50° C. and 300° C. by the surrounding rock, after moving back up to the surface.

For example, at a depth located between 3000m and 5000m under the surface, the temperature is generally between 120° C. and 180° C., and the heating of the cementitious composition is then endured.

Thus, advantageously, according to the particular use of the calcium aluminate cement according to the invention, the aqueous suspension has a satisfactory workability at ambient temperature, i.e. its viscosity at ambient temperature is sufficiently low to allow it to be injected by means of pumps, and the hardening of said aqueous suspension is produced after it is injected into the wells, when the surrounding temperature rises.

Advantageously, there is no need to add a retarder to the aqueous suspension formed as such.

The user can also choose to activate the phenomenon of the hydraulic setting of the cementitious composition according to the invention by heating said cementitious composition to a temperature chosen between 50° C. and 300° C. This is therefore a voluntary heating.

Advantageously, the user can thus choose the moment when the hydraulic setting phase is triggered, by choosing the moment when he heats the cementitious composition.

Whether the heating is voluntary or is endured, the thickening phase, which globally corresponds to the open time, is complete at the moment of this heating.

EXAMPLES

In the part that follows, examples have been implemented in order to assess the properties of the calcium aluminate cement according to the invention, and to compare them with those of other existing cements.

To do so, various cementitious compositions have been formed from various calcium aluminate cements, of which the cement according to the invention, and these cementitious compositions have been characterised using several tests.

Two main aspects make it possible to characterise a cementitious composition: its workability which translates the open time during which the cementitious composition has a viscosity adapted to its use, and its hardening kinetics.

The hardening kinetics reflect the speed of thickening of the cementitious composition and the instant from which the hydraulic setting is initiated, as well as the mechanical resistance reached by the hardened final material obtained from the cementitious composition after the latter has reacted with the available added water, at the time desired according to the application.

The characteristics of workability and of hardening kinetics can be quantified in different ways, by different test methods and according to different standards. Thus, these characteristics of workability and of hardening kinetics can be quantified by different characteristic times measured, for example a gelling time, a time for initial setting or a thickening time, such as defined hereinafter.

Of course, according to the uses planned for the cementitious compositions, the workability and the hardening kinetics sought can vary.

I. Preliminary Tests
1/Cements Compared

In practice, here, a first, a second, and a third calcium aluminate cement (Cement1, Cement2, Cement3) were used in order to form different cementitious compositions of which the properties were compared.

More precisely, the first and second cements (Cement1, Cement2) are calcium aluminate cements of prior art known under the commercial denominations of Ciment fondu® and SECAR®71.

The third cement (Cement3) is a calcium aluminate cement according to the invention.

It is obtained according to the industrial method described hereinabove, by co-grinding 63.5% of Bauxite and 36.5% of Limestone, by weight with respect to the total weight of the co-ground materials.

Table "Composition" hereinbelow shows the chemical composition measured for this third cement Cement3 according to the invention, as well as the chemical composition of the raw materials used in order to obtain it (Bauxite and Limestone). These compositions are given as a percentage by weight (%), i.e. they indicate the weight of the compound with respect to the total dry weight of the cement or of the raw material used.

TABLE

"Composition"

|  | Cement3 | Bauxite | Limestone |
|---|---|---|---|
| SiO2 (%) | 7.02 | 7.67 | 0.30 |
| Al2O3 (%) | 58.90 | 77.59 | 0.20 |
| Fe2O3 (%) | 2.85 | 2.30 | 0.08 |
| CaO (%) | 26.62 | 3.69 | 55.52 |
| MgO (%) | 0.52 | 0.39 | 0.28 |
| SO3 (%) | 0.20 | 0.16 | 0.03 |
| K2O (%) | 0.55 | 0.91 | 0.02 |
| Na2O (%) | 0.07 | 0.16 | 0.00 |
| TiO2 (%) | 2.78 | 3.72 | 0.00 |
| P2O5 (%) | 0.17 | 0.15 | 0.00 |
| Mn2O3 (%) | 0.01 | 0.02 | 0.00 |
| Cr2O3 (%) | 0.03 | 0.08 | 0.00 |
| LOI (%) | 0.28 | 2.78 | 43.54 |

The LOI line (Loss on Ignition) here groups together the volatile elements such as the residual humidity in the case with bauxite or carbon dioxide CO2 in the case with limestone.

Table 5 hereinbelow gives the mineralogical phases contained in these first, second and third cements (Cement1, Cement2, Cement3). The mineralogical phases were measured by a known technique of X-ray diffraction (often shortened to DRX).

TABLE 5

|  | CA | CA2 | C2AS | C2S | Ferrites | Other |
|---|---|---|---|---|---|---|
| Cement1 | 55% | na | 3% | 9% | 11% | 22% |
| Cement2 | 60% | 40% | na | na | na | na |
| Cement3 | 3% | 55% | 29% | na | 1% | 12% |

The notation na means that the cement does not comprise the corresponding mineralogical phase or that these phases are present in very low unmeasured quantities.

The mineralogical phase Ferrites substantially comprises the mineralogical phase of tetra-calcium ferro-aluminate C4AF, called in what follows sixth crystallised mineralogical phase. The crystallised lattice of this sixth crystallised mineralogical phase comprises four molecules of lime C for one molecule of alumina A and one iron oxide $Fe_2O_3$, shortened to the letter F.

The "Other" column groups together the impurities comprised in these cements, namely at least one of the following compounds: iron oxide $Fe_2O_3$, titanium oxide $TiO_2$, sulphur oxide $SO_3$, magnesium oxide MgO, and alkaline compounds.

In particular, the "Other" column of the cement Cement1 of prior art comprises the mineralogical phases CA6 and C4A3$. More precisely, the cement Cement1 comprises 0% of phase CA6 and about 0.7% of C4A3$, by weight with respect to the total weight of all of the phases contained in said Cement1.

The cement Cement3 comprises 3% of phase CA6 and 4% of phase C4A3$, by weight with respect to the total weight of all of the mineralogical phases contained in said Cement3.

In light of the industrial manufacturing of this third calcium aluminate cement according to the invention, the proportion of the mineralogical phases that it comprises can vary slightly from one manufacturing campaign to another.

Thus, another cement according to the invention Cement3bis having the proportions of mineralogical phases described in Table 6 was also obtained in conditions similar to the conditions of obtaining the third cement according to the invention Cement3.

TABLE 6

| | |
|---|---|
| CA2 (%)* | 59.2 |
| C2AS (%)* | 22.5 |
| CT ortho. (%) | 4.6 |
| CA6 (%) | 5.4 |
| CA (%) | 0.9 |
| Spinel MA (%) | 1.2 |
| C4A3$ (%) | 4.2 |
| C4AF (%) | 0.6 |
| Fer spinel (%) | 0.7 |
| Alu α (%) | 0.5 |
| C12A7 (%) | 0.0 |
| MgO (%) | 0.2 |
| CaO (%) | 0.2 |

This other calcium aluminate cement according to the invention, thus comprises 72.5% of mineralogical phase CA2 and 27.5% of mineralogical phase C2AS, by weight with respect to the two mineralogical phases CA2, C2AS only.

A reference cement (CementRef) was also used in comparing the first, second and third calcium aluminate cements Cement1, Cement2, Cement3.

This reference cement CementRef is a Portland cement of class G that is conventionally known to those skilled in the art and often used in applications of the oil drilling type.

The reference cement CementRef has a Blaine specific surface area of about 3010 cm²/g.

2/Thickening Time

A first test that made it possible to characterise the studied cements consisted in measuring the thickening time of different cementitious compositions obtained by mixing these cements with water.

The thickening time is a piece of information that makes it possible to assess the workability of the cementitious composition, in particular when it has the form of an aqueous suspension.

In the meaning that is intended here, the thickening time is an estimation of the duration at the end of which the cementitious composition can no longer be pumped. In other words, this is the duration at the end of which an aqueous suspension is too viscous to be able to be displaced by means of a pump.

More precisely, the thickening time corresponds to the duration that has elapsed between the moment when the water and the cement have been mixed in order to form the cementitious composition in the form of aqueous suspension, and the moment when the consistency, referred to as Bearden consistency (Bc), of the cementitious composition has reached a value such that this cementitious composition can no longer be pumped, wherein the Bearden consistency is expressed using a magnitude without a unit.

Here, the measurement of the thickening time is achieved according to the standard "ISO 10426-1, clause 10.3", from document "*Petroleum and natural gas industries—Cement and materials for well cementing*", of which the first part NF-EN-ISO-10426-1 is entitled "Part 1—Specifications" and is based on the standard ISO 10426-1:2005, and the thickening time is such that the cementitious composition has reached a Bearden consistency of 100 Bc, at 23° C., under an atmospheric pressure of 1 atmosphere (atm).

In practice, the measuring of this thickening time is carried out for example by means of a brewing blade adapted to rotate in the cementitious composition while measuring a torque. This measured torque makes it possible to assess the force that the blade has to exert on the cementitious composition in order to be able to rotate. This torque is thus related to the Bearden consistency of the cementitious composition.

Table 7 hereinbelow shows different cementitious compositions that were formed using the three calcium aluminate cements Cement1, Cement2, Cement3, and Portland cement CimentRef, as well as the thickening time that is associated to them, at ambient temperature (23° C.).

In practice, these cementitious compositions were formed at 23° C., by mixing the cement with the appropriate quantity of water (indicated in table 7) for 15 seconds under stirring at 4000 revolutions per minute (rpm). An additional stirring at 12,000 revolutions per minute for 35 seconds was then carried out.

In this table 7, the water/cement ratio represents the weight of the water that was introduced in order to form the cementitious composition, with respect to the weight of the dry cement.

TABLE 7

| Name of the cementitious composition | Cement used | Water/cement ratio | Thickening time (hours:minutes) |
|---|---|---|---|
| Compo1 | Cement1 | 0.5% | 1:21 |
| Compo2 | Cement2 | 0.5% | 0:48 |
| Compo3 | Cement3 | 0.38 | 10:26 |
| CompoRef | CimentRef | 0.44 | 5:38 |

In table 7, it can be seen that the cementitious compositions Compo1 and Compo2 formed using the calcium aluminate cements of prior art Cement1 and Cement2 have relatively short thickening times (less than 2 hours) at ambient temperature (23° C.). If a user needs more time than these thickening times in order to be able to use the cementitious compositions comprising the two cements Cement1 and Cement2, he will have to add setting retarders to them.

The cementitious composition CompoRef comprising the CimentRef confirms that Portland cements have an average thickening time (around 5 hours) at ambient temperature (23° C.). That is why these cements are often used in applications that require a rather long implementation time.

The cementitious composition Compo3 comprising the calcium aluminate cement according to the invention Cement3 has a thickening time greater than 10 hours, which offers the possibility to the user to use—for example to transport, pour, inject, pump, etc.—this cementitious composition Compo3 for a long time, and this without having to add retarder therein.

Furthermore, it has a thickening time nearly twice as long as that of the cementitious composition CompoRef at ambient temperature (23° C.), even though it comprises less water and should therefore be more reactive than the cementitious composition CompoRef.

The cement according to the invention Cement3 therefore has very high workability without adding setting retarder. Thus, it is particularly suitable for applications that require a very long open time, and this without chemical pollution linked to the use of setting retarders.

3/Viscosity

A second test that made it possible to characterise the cements studied consisted in measuring the viscosity of certain cementitious compositions.

3a. Fann®35 Viscometer

The viscosity makes it possible to assess the hardening kinetics and the workability of these cementitious compositions.

This is here about measuring the rheology of the cementitious compositions, i.e. their ability to flow and/or to be deformed.

In the meaning that is intended here, measuring the viscosity is carried out according to the standard ISO 10426-2, clause 12. This standard comes from the second part of the "*Petroleum and natural gas industries—Cement and materials for well cementing*", said part entitled "*Part 2—Testing of well cements*" and based on the publication API RP 10B, 22nd edition, of December 1997, addendum 1, of October 1999.

More precisely, the implementing of the viscosity test is carried out as follows: the cement is mixed with the chosen quantity of water in order to form the cementitious composition (operating method detailed hereinabove), then this cementitious composition is placed in a rotating viscometer of the brand FANN®, model 35.

The rotating viscometer FANN®35 is said to be "with direct indication". In practice, two coaxial cylinders are plunged vertically into the cementitious composition. The outer cylinder—also called a sleeve—is driven in rotation by a motor at a speed chosen by the operator. The inner sleeve is linked to the frame by a torsion spring. The cementitious composition, set into movement by the outer cylinder, exerts a torque on the inner sleeve, and this torque is proportional to the angle of torsion of said spring.

The direct reading of the angle of torsion of the spring (in degrees) is linked to the shear stress (in Pascal) of the cementitious composition, which translates the viscosity of said cementitious composition. This measurement is commonly referred to as "FANN®35 reading".

In practice, the outer cylinder rotates at a rotation speed chosen by the operator with a potentiometer, ranging from 3 to 300 revolutions per minute, and a crosshair makes it possible to visually measure on a graduated disc the angle of rotation of the spring linked to the inner sleeve, wherein this angle of torsion is proportional to the torque generated by the cementitious composition in movement on the inner sleeve.

It is then possible to follow the change of the angle of torsion of the spring linked to the inner sleeve, according to the rotation speed of the outer cylinder.

It is furthermore possible to test on a one-off basis the cementitious composition in order to estimate its viscosity directly after the mixing between the cement and the water (Initial viscosity V1), or after a rest period of 10 minutes (Viscosity V2), at a temperature of 23° C., of 50° C. or of 80° C. and at atmospheric pressure of about 1 atmosphere (atm), for a rotation speed of the viscometer of 3 revolutions per minute (rpm).

In practice, as indicated hereinabove, the values read are those of the angle of torsion of the spring linked to the inner sleeve of the viscometer Fann®35.

Table 8 hereinbelow shows the various cementitious compositions tested and gives the values of the angle of torsion of the inner sleeve representative of their respective viscosity V1 and V2 at 23° C., table 9 shows similar cementitious compositions and values of the angle of torsion of the inner sleeve that are representative of their viscosity at 50° C., and table 10 shows the same cementitious compositions as those of table 9 and values of the angle of torsion of the inner sleeve that are representative of their viscosities at 80° C.

In these three tables 8, 9 and 10, the cementitious compositions tested depend on the cement used and the Blaine specific surface area chosen for the cement as well as the water/cement ratio chosen.

The values indicated for the viscosities V1 and V2 are here the values of the angle of torsion measured.

TABLE 8

| Cementitious composition | Cement used | Water/cement ratio | Blaine Specific Surface Area ($cm^2 \cdot g^{-1}$) | Initial viscosity V1 | Viscosity V2 |
|---|---|---|---|---|---|
| Compo5 | Cement2 | 0.41 | 4000 | 14 | >300 |
| Compo6 | Cement3 | 0.41 | 2200 | 6 | 21 |
| Compo7 | Cement3 | 0.41 | 3080 | 10 | 37 |
| Compo8 | Cement3 | 0.41 | 3470 | 13 | 38 |
| Compo9 | Cement3 | 0.41 | 3700 | 14 | 36 |
| Compo10 | Cement3 | 0.41 | 4100 | 18 | 58 |

Thus, the cementitious composition Compo5 comprising the calcium aluminate cement of prior art Cement2 has an initial viscosity V1 that is acceptable in order to be able to be manipulated, i.e. for a setting up for example by pumping, but its viscosity after 10 minutes is that of a gelled cementitious composition. Consequently, as soon as the cementitious composition Compo5 is left immobile for an excessive period of time, it can no longer be manipulated. This is particularly compromising when it is desired to displace such a cementitious composition using pumps, which would then risk being damaged when starting up after temporary stoppage.

In contrast, the cementitious compositions Compo6 to Compo10 according to the invention are particularly advantageous in that their initial viscosities V1 are low (less than 20), which facilitates their transport by means of a pump. Their viscosity V2 after a time of rest also remains sufficiently low so that they can be pumped.

Thus, the hardening kinetics of the cementitious compositions comprising the calcium aluminate cement Cement3 according to the invention is much slower, at ambient temperature, than those of the cementitious compositions of prior art, which is an advantage for uses that require a long manipulation.

Furthermore, table 8 also gives an indication of the reactivity of the calcium aluminate cement Cement3 according to the invention according to the Blaine specific surface area. One indeed notes that the more the Blaine specific surface area increases, the more the initial viscosity and the viscosity after rest increase. Thus, the hardening kinetics accelerates when the Blaine specific surface area increases, which translates the fact that the finest grains of powder are more easily hydrated by water as they have a larger reactive surface.

TABLE 9

| Cementitious composition | Cement used | Water/cement ratio | Blaine Specific Surface Area ($cm^2 \cdot g^{-1}$) | Initial viscosity V1 | Viscosity V2 |
|---|---|---|---|---|---|
| Compo11 | Cement2 | 0.48 | 4000 | 24 | >300 |
| Compo12 | Cement3 | 0.48 | 3470 | 13 | 67 |

TABLE 9-continued

| Cementitious composition | Cement used | Water/cement ratio | Blaine Specific Surface Area (cm² · g⁻¹) | Initial viscosity V1 | Viscosity V2 |
|---|---|---|---|---|---|
| Compo13 | Cement3 | 0.48 | 4100 | 20 | 121 |
| Compo14 | Cement3 | 0.48 | 4400 | 27 | 145 |

By comparing tables 8 and 9, it is observed that the initial viscosity of the cementitious composition Compo11 of table 9 comprising the calcium aluminate cement Cement2 of prior art increases when the temperature increases, even though it comprises more water than the similar cementitious composition Compo5 of table 8.

Furthermore, as in the case of the cementitious composition Compo5, the viscosity V2 after a pause of the cementitious composition Compo11 is also excessively substantial for this cementitious composition 11 to be able to be used in pumps without adding setting retarder to it.

Moreover, the cementitious compositions according to the invention Compo12 to Compo14 have low initial viscosities V1 and viscosities V2 after a pause time that still allows for their use as well as their transport by means of pumps.

Furthermore, at this temperature (50° C.), the Blaine specific surface area plays an important role on the viscosity: the more the Blaine specific surface area increases, the more the viscosity increases.

TABLE 10

| Cementitious composition | Initial viscosity V1 | Viscosity V2 |
|---|---|---|
| Compo11 | >300 | >300 |
| Compo12 | 7 | 138 |
| Compo13 | 14 | 195 |
| Compo14 | 28 | 270 |

Table 10 shows that at 80° C., the cementitious composition Compo11 comprising the calcium aluminate cement of prior art Cement2 cannot be used because its viscosity is too high as soon as it is mixed with water.

The initial viscosity V1 of the cementitious compositions comprising the cement Cement3 according to the invention is of the same order of magnitude at 80° C. as at 50° C.

However, the increase in temperature influences the viscosity V2 after a pause time of the cementitious compositions Compo12 to Compo14. Indeed, the viscosity after a pause clearly increases between 50° C. and 80° C., and all the more so if the Blaine specific surface area is large. This confirms the fact that the temperature favours the reaction between the water and the cement Cement3 according to the invention.

3b. Anton Paar Viscometer

Moreover, other measurements of viscosity can be taken with an Anton Paar viscometer (or rheometer).

In practice, the Anton Paar rheometer is referenced as MCR_302 ®). It is provided with a with a cup CC27 and with a mixing baffle with 6 straight rectangular blades of 16 millimetres (mm) high over 9 mm long, around a shaft of 4 mm in diameter.

The Anton Paar viscometer makes it possible to follow the change of the viscosity as a function of time, at a given temperature, when the blade is rotating at a chosen speed.

To do this, the rheometer measures in reality the torque applied by the cementitious composition on the blade in rotation in said cementitious composition.

The torque measured is representative of the viscosity of the cementitious composition.

Here, the change in this torque as a function of time has been followed, at 80° C., when the blade imposes a shear rate of 500 s⁻¹.

Thanks to the curve obtained, it is possible to go back to the beginning of the setting, namely to the so-called "gel" (or gelling) time corresponding to the location of the change in the slope of the curve that represents the torque as a function of time.

Following table 11 shows in parallel the viscosity measured by the Fann®35 viscometer after 10 minutes of rest (V2), and the gelling time of the two cementitious compositions according to the invention comprising the cement Cement3bis, and of the cementitious composition of prior art comprising the Portland cement CementRef.

TABLE 11

| Cementitious Composition | Cement used | Water/Cement Ratio | Blaine Specific Surface Area (cm² · g⁻¹) | Viscosity V2 (Fann®35, 23° C.) | Gelling time (minutes) (Anton Paar, 80° C.) |
|---|---|---|---|---|---|
| Compo15 | Cement3bis | 0.41 | 3070 | 38 | 48 |
| Compo16 | Cement3bis | 0.48 | 3070 | 25 | 77 |
| CompoRef | CementRef | 0.44 | 3010 | 30 | 90 |

Moreover, the experimental results show that the cementitious compositions comprising the cement Cement3bis according to the invention are less viscous in short times than that comprising the Portland reference cement.

Furthermore, the cementitious compositions compo 15 and compo 16 according to the invention show a clean and fast setting compared to the composition CompoRef. The rupture in the slope of the experimental curve between the thickening phase and the setting phase is then highly marked.

Finally, on can note that the gelling time depends on the water/cement ratio applied to the cement according to the invention.

4/Measurement of Bleeding

Measuring bleeding consists in determining the mass of water that appears on the surface of a given quantity of aqueous suspension, after immobilisation of this aqueous suspension for 2 hours.

The water that appears on the surface is given as a percentage (%), by weight with respect to the total weight of the water added to the aqueous suspension.

In order for the aqueous suspension to be accepted from the standpoint of the standards of the "American Petroleum Institute (API)", the maximum percentage authorised of water bled is 5.9%.

In practice, measuring bleeding is here carried out at 23° C., in a cylindrical container with a capacity of 250 millilitres (ml).

Following table 12 gives the percentages of water bled of the three compositions Compo15, Compo16 and CompoRef studied hereinabove.

TABLE 12

| Cementitious Composition | Cement used | Water/Cement Ratio | Blaine Specific Surface Area (cm$^2 \cdot$ g$^{-1}$) | Water bled (%) |
|---|---|---|---|---|
| Compo15 | Cement3bis | 0.41 | 3070 | 1.0 |
| Compo16 | Cement3bis | 0.48 | 3070 | 2.8 |
| CompoRef | CementRef | 0.44 | 3010 | 4.8 |

Note here that the cement according to the invention bleeds less than the reference cement, even at higher water/cement ratios, which is favourable for ensuring its conformity with the API standards.

5/Mechanical Resistance

On the other hand, it is also possible to assess the hardening kinetics of the cementitious compositions by measuring the mechanical resistance reached by the hardened final material obtained after reaction between the water and the cement.

In practice, the cementitious composition is formed by mixing the water and the cement, then the cementitious composition is allowed to rest for 24 hours, at a chosen temperature and at a chosen pressure, before measuring the mechanical resistance according to the standard ISO 10426-1, clause 9.2.

Table 13 shows the mechanical resistances of the three cementitious compositions Compo1, Compo2 and Compo3 after 24 hours at 37° C. and under atmospheric pressure (R1), after 24 hours at 60° C. and under atmospheric pressure (R2), and after 24 hours at 110° C. and under pressure of 20.7 MegaPascal (R3).

The mechanical resistances R1, R2 and R3 are given in MegaPascal (MPa).

TABLE 13

| Cementitious composition | Mechanical resistance R1 (MPa) | Mechanical resistance R2 (MPa) | Mechanical resistance R3 (MPa) |
|---|---|---|---|
| Compo1 | 6.3 | 6.4 | 11.8 |
| Compo2 | 17.4 | 21.5 | 25.2 |
| Compo3 | 0 | 0.8 | 23.6 |

From 37° C., the mechanical resistance developed by the cementitious compositions Compo1 and Compo2 comprising calcium aluminate cements Cement1 and Cement2 according to prior art is substantial, which confirms the fact that these cementitious compositions Compo1 and Compo2 react at low temperature.

On the contrary, the cementitious composition Compo3 comprising the cement Cement3 according to the invention has a zero mechanical resistance at 37° C., and a practically zero one at 60° C., which indicates that this cement reacts only very little under 60° C. Thus, this supports the fact that the reaction of the cement according to the invention with water is naturally retarded at temperatures less than 60° C., without having to add a retarder.

After 24 hours at 110° C., the mechanical resistances of the cementitious compositions Compo1 and Compo2 are higher, which proves that these cementitious compositions react more quickly at this temperature than at a temperature of 37° C.

At 110° C., the cementitious composition Compo3 also develops a mechanical resistance of about twenty megaPascals. Thus, the reaction between the cement according to the invention and the water is favoured by high temperatures.

Consequently, the calcium aluminate cement according to the invention has a hardening kinetics that is naturally controlled by the temperature, without needing to add a retarder.

Furthermore, at 110° C., the mechanical resistance R3 developed by the cementitious composition Compo3 comprising the calcium aluminate cement Cement3 according to the invention is similar to that of the calcium aluminate cements that are usually used and known to date (of about 20 MPa).

It is therefore adapted to similar applications.

6/Setting Time and Contamination

6a. Test with Vicat Needle

Another test dealt with the effect of the contamination of a cement Portland by a cement according to the invention.

To this effect, a measurement was taken of the setting time of the various cementitious compositions that comprise both a Portland cement and a calcium aluminate cement.

In the meaning that is intended here, the setting time is measured according to the standard ASTM C91, using a Vicat needle.

The Vicat test consists in mixing water with the cement in order to form the cementitious composition, then in allowing a Vicat needle to fall into the cementitious composition, which is static, at regular intervals of time. As long as the needle sinks to the bottom of the cementitious composition, it is considered that the setting time has not been reached, as soon as it sinks without being able to go to the bottom of the cementitious composition, the setting time has been reached.

In practice, the setting time therefore corresponds to the duration that has elapsed between the moment when the cement and the water were mixed in order to form the cementitious composition in a liquid state, and the moment when the cementitious composition passed to a state that is sufficiently solid so that the Vicat needle cannot pass entirely through it but only partially, at a temperature of 23° C. and under atmospheric pressure (1 atm).

Table 14 hereinbelow shows the setting times, in minutes, of different cementitious compositions comprising a certain proportion of calcium aluminate cement mixed with a Portland cement. The Portland cement used is a Portland cement of class H.

In this table 14, the percentages give the weight of the calcium aluminate cement added with respect to the total dry weight of the cement used. Thus, the complement for reaching 100% corresponds to the weight of Portland cement contained in the total dry weight of the cement.

The water/cement ratio is 0.38, i.e. the weight of the water used represents 38% of the total dry weight of the cement used.

TABLE 14

| Calcium aluminate cement used | 0% | 5% | 8% | 15% |
|---|---|---|---|---|
| Cement1 | 400 | 310 | 220 | 20 |
| Cement2 | 400 | 190 | 45 | 10 |
| Cement3 | 400 | 340 | 320 | 300 |

Table 14 shows the effect on the setting time of the contamination of a Portland cement by a calcium aluminate cement.

According to table 14, the calcium aluminate cements of prior art Cement1 and Cement2 have a substantial effect on the setting time of the Portland cement used. Indeed, while the Portland cement alone, corresponding to the first column, has a relatively long setting time that is of 400 minutes, the setting time observed for a mixture with 15% of calcium aluminate cement Cement1 and Cement2 is very short (20 and 10 minutes respectively). This means that a cementitious composition containing a Portland cement and a calcium aluminate cement of prior art reacts ultra quickly, preventing the use of such a cementitious composition for applications that require long implementations. Such cementitious compositions therefore cannot be used in applications of the drilling well type for example.

In contrast, the contamination of the Portland cement by the cement Cement3 according to the invention has only very little effect, at ambient temperature, on the setting time of the cementitious composition. Indeed, the setting time of a cementitious composition comprising 15% of Cement3 and 85% of Portland cement corresponds to 75% of the setting time of a cementitious composition comprising 100% of Portland cement.

Consequently, the use of the calcium aluminate cement Cement3 according to the invention is facilitated as compared to the other calcium aluminate cements in that it is not necessary to perfectly clean the installations before being able to use these installations for a Portland cement.

6b. Test Via Anton Paar Rheometer

Moreover, other tests have made it possible to measure the effect of the contamination of a Portland cement by a cement according to the invention, or of the contamination of a cement according to the invention by a Portland cement.

These tests consisted in following the torque exerted by the cementitious compositions on the blade of the Anton Paar rheometer rotating at a constant shearing speed of 500 $s^{-1}$, as a function of time, at 20° C. or at 80° C.

The curve obtained makes it possible to deduce the gelling time (such as is explained in the point 3b. Anton Paar Viscometer hereinabove).

The curve obtained also makes it possible to determine the duration elapsing between the formation of the cementitious composition and the moment when the torque reaches 4 mN.m.

This duration makes it possible to quantify the "setting time" of the cementitious composition. This is a value of this setting time that is not necessarily equal to the value of the setting time measured by the Vicat test.

For this measurement, the cementitious compositions are prepared as follows: 100 g of cement are mixed with 44 g of water (i.e. a water/cement ratio of 0.44), using a Rayneri Turbotest mixer, for 15 seconds at 1000 revolutions per minute, then for 120 seconds at 3300 revolutions per minute.

Table 15 hereinbelow shows the results obtained.

TABLE 15

| Cements used | | | Time measured at 20° C. | |
|---|---|---|---|---|
| CimentRef | Cement3bis | Cement2 | 20° C. | |
| (%) | (%) | (%) | gelling (min) | setting (min) |
| 0 | 100 | 0 | 420 | 420 |
| 10 | 90 | 0 | 420 | 420 |
| 25 | 75 | 0 | 190 | 260 |
| 90 | 10 | 0 | 420 | 420 |

TABLE 15-continued

| Cements used | | | Time measured at 20° C. | |
|---|---|---|---|---|
| CimentRef | Cement3bis | Cement2 | 20° C. | |
| (%) | (%) | (%) | gelling (min) | setting (min) |
| 90 | 0 | 10 | 10 | 10 |
| 100 | 0 | 0 | 420 | 420 |

In this table 15, the percentages are given by weight with respect to the total weight of the cement.

When the value of the gelling time and/or of the setting time is 420 minutes, this means that the experiment was stopped before the material has undergone gelling or setting. In these cases, the gelling and setting times are in reality much higher than 420 minutes.

Note that when the Portland cement CimentRef is contaminated with up to 10% of cement Cement3bis according to the invention, at 20° C., the gelling and setting times are not affected, i.e. they are similar to those obtained for the Portland cement CimentRef alone.

In contrast, when the Portland cement is polluted with 10% of the cement of prior art Cement2 at 20° C., the setting and gelling times fall dramatically: they are both of 10 minutes.

Moreover, when the cement Cement3bis according to the invention is polluted with up to 10% of Portland Cement CementRef at 20° C., the gelling and setting times are not affected, i.e. they are similar to those obtained for the cement Cement3bis alone.

When the cement according to the invention Cement3bis is polluted with 25% of Portland cement CementRef, the gelling and setting times remain satisfactory: they are respectively about 190 minutes and 260 minutes.

As such, the use of the calcium aluminate cement according to the invention is facilitated at ambient temperature with respect to cements of prior art in that it is not necessary to clean the installations after or before using these installations with Portland cement.

7/Degree of Hydration

A last test consisted in assessing the influence of the temperature on the degree of hydration of the cement Cement3 according to the invention.

This test is based on observations under the scanning electron microscope allowing for an elementary chemical analysis as well as on measurements of X-ray diffractions that allow for a quantification of the mineralogical phases according to the Rietveld method.

In practice, a cementitious composition Compo15 was formed by mixing water with the cement Cement3 according to the invention in a water/cement ratio of 0.44, i.e. in such a way that the water represents 44% by weight with respect to the total dry weight of the cement.

A cementitious composition Compo16 was also formed by mixing water with the cement Cement2 of prior art in a water/cement ratio of 0.44.

These cementitious compositions Compo15 and Compo16 were then subjected to an X-ray diffraction test as soon as they were formed (D1), after a cure, i.e. a rest at 23° C. for 24 hours (D2), after a passage in the autoclave for 24 hours at 120° C. (D3), and after a passage in the autoclave for 24 hours at 180° C. (D4).

The results of this X-ray diffraction test make it possible to estimate the percentage of each mineralogical phase present in the cementitious compositions Compo15 and Compo16 as well as the remaining free water, by weight with respect to the total weight of the cementitious composition Compo15, according to the treatment that they were subjected to.

The results also make it possible to estimate the percentage of hydrates formed during the hydration reaction of the water with the cements Cement3 and Cement2, according to the different treatments that are undergone. Hydrates are compounds formed between the water (noted as H) and the hydrated chemical compounds coming from the mineralogical phases comprised initially in the cements studied.

In other words, the results of the X-ray diffraction test make it possible to estimate the degree of hydration of the mineralogical phases of the cement according to the invention Cement3 or of the cement of prior art Cement2, according to the temperature.

"Free water" means the water that is not engaged in the bonds with ions coming from the various hydrated mineralogical phases, i.e. which does not already belong to a formed hydrate. In other words, this is the water that is still available to react with (or hydrate) the anhydrous mineralogical phases that still exist.

In tables 16 and 17, the "other" phase groups together the possible impurities (iron oxide $Fe_2O_3$, titanium oxide $TiO_2$, sulphur oxide $SO_3$, magnesium oxide MgO, and alkaline compounds).

Table 16 hereinbelow shows the results of the X-ray diffraction test, namely the percentage of each mineralogical phase and of each hydrate present after each treatment undergone by the cementitious composition Compo15.

Table 17 shows the results of the X-ray diffraction test, after each treatment undergone by the cementitious composition Compo16.

TABLE 16

| Phases | D1 | D2 | D3 | D4 |
|---|---|---|---|---|
| CA2 | 39% | 36% | 0% | 0% |
| C2AS | 20% | 20% | 14% | 11% |
| Other | 10% | 8% | 8% | 8% |
| Free water | 31% | 26% | 16% | 19% |
| CAH10 | 0% | 6% | 0% | 0% |
| C3AH6 Katoite | 0% | 0% | 27% | 22% |
| C3AS(3-x)H4x Hibshite | 0% | 0% | 0% | 7% |
| AH3 Gibbsite | 0% | 4% | 14% | 0% |
| AH Boehmite | 0% | 0% | 21% | 33% |

In table 16, the "other" phase also comprises the phase CA. This phase CA is present initially during the mixture between the cement3 and water (column D1), and is absent from the mixture after 24 hours of reaction (columns D2, D3 and D4) as it has fully reacted with the water, regardless of the temperature.

The "Other" line further comprises the phase CA6. Here, the phase CA6 represents 2.3%, by weight, of all of the phases comprised in the composition Compo15 at the time of the diffraction D1, 2.6% by weight, of all of the phases comprised in this composition at the time of the diffraction D2, 2.2% by weight of all of the phases comprised in this composition at the moment of the diffraction D3 and 2% by weight of all of the phases comprised in this composition at the moment of the diffraction D4.

As shown in table 16, the first and second mineralogical phases CA2, C2AS react little, even not at all, under 120° C.

However, the first mineralogical phase CA2 reacts fully from 120° C. In other words, starting at 120° C., the first mineralogical phase CA2 is entirely hydrated by the water.

The second mineralogical phase C2AS reacts starting at 120° C., but it is less reactive than the first mineralogical phase CA2.

Thus, the reactivity of the first mineralogical phase CA2 is favoured by a temperature less than that favouring the reactivity of the second mineralogical phase C2AS.

The CA6 does not react regardless of the temperature, the variations in the composition being attributed to the uncertainties inherent to the measuring method.

TABLE 17

| Phases | D1 | D3 | D4 |
|---|---|---|---|
| CA | 40% | 0% | 0% |
| CA2 | 27% | 0% | 0% |
| Other | 2% | 0% | 0% |
| Free water | 31% | 2% | 11% |
| C3AH6 Katoite | 0% | 45% | 44% |
| AH3 Gibbsite | 0% | 41% | 0% |
| AH Boehmite | 0% | 12% | 45% |

By comparing tables 16 and 17, note that the hydrates C3AH6, AH3, and AH formed by the hydration reaction of the calcium aluminate cement of prior art Cement2 with water are also formed by the hydration reaction of the calcium aluminate cement according to the invention Cement3 with water.

Furthermore, during the hydration reaction of the calcium aluminate cement Cement3 according to the invention with water, an additional hydrate $C3AS_{(3-x)}H_{4x}$ is also formed.

Thus, the presence of the same hydrates in the hardened final material obtained from the calcium aluminate cement Cement2 of prior art and in the hardened final material obtained from the calcium aluminate cement Cement3 according to the invention shows that the properties of chemical resistance of these hardened final materials are similar.

Consequently, the cement according to the invention has properties of chemical resistance similar to those of the calcium aluminate cements already known.

Thus, all the experiments conducted show that the calcium aluminate cement according to the invention has a slow hardening kinetics at ambient temperature, which makes it possible to use it without setting retarder.

This hardening kinetics can be adjusted according to the temperature and by choosing the relative proportion of first and of second mineralogical phase CA2, C2AS.

Furthermore, at ambient temperature, the calcium aluminate cement according to the invention has a low contaminating power on Portland cements.

Finally, the mechanical properties of the hardened final material obtained from the calcium aluminate cement according to the invention are similar to those of the hardened final materials obtained using known calcium aluminate cements.

8/Density of the Cementitious Composition

In the case of oil drilling applications, the density determines the capacity of the cementitious composition used in the oil wells to retain the gases and the oil contained in said wells.

The density is assessed by relating the weight of the aqueous suspension to its volume.

In practice, here is measured the weight of 250 ml of aqueous suspension.

The density is expressed in "pounds per gallon (ppg)", knowing that 1 ppg is 0.12 kilogram per cubic decimetre ($kg/dm^3$) or 0.12 gram per cubic centimetre ($g/cm^3$).

Following table 18 presents the specific density of the cementitious compositions comprising the Cement3bis according to the invention and the Portland cement CementRef.

TABLE 18

| Cementitious composition | Cement used | Water/cement ratio | Blaine Specific Surface Area (cm$^2$/g) | Density (ppg) |
|---|---|---|---|---|
| Compo15 | Cement3bis | 0.41 | 3070 | 16.0 |
| Compo16 | Cement3bis | 0.48 | 3070 | 15.3 |
| CompoRef | CimentRef | 0.44 | 3010 | 15.8 |

Thus, one can note that the densities of the cementitious compositions Compo15 and Compo16 according to the invention are similar to that of the Portland reference cement and therefore adapted to the applications for oil drilling.

II. Additional Tests

1/Cements Compared

A fourth, a fifth and a sixth calcium aluminate cement according to the invention (Cement4, Cement5, Cement6) were used in order to form different cementitious compositions of which the properties were compared.

The fourth, fifth and sixth cements Cement4, Cement5, Cement6 are obtained in the laboratory using the following practically pure raw materials: the source of silica Millisil E400®, the source of alumina AL170® and the source of limestone Calcite Normapu®. The exact compositions of these raw materials are given in the table 19 hereinbelow.

In practice, the cements Cement4, Cement5 and Cement6 are obtained according to the following operating mode:
  Weighing of raw materials;
  Co-grinding of the raw materials in the jar-rotator, in a tank of 6 litres, of the brand Linatex, for about 16 h, until a powder is obtained comprising particles of which the maximum diameter is less than or equal to 100 micrometres (μm);
  Granulating with water according to a technique known to those skilled in the art referred to as "disc granulating" in order to obtain granules from about 1 cm to 3 cm in diameter;
  Steaming of these granules at 110° C., for at least 15 h;
  cooking in a crucible made of alumina introduced into an electric oven;
  grinding;
  Fin grinding in the steel ball mill BB10® model in order to obtain a Blaine specific surface area close to 3000 cm$^2$/g.

In order to reach the desired cooking temperature, the temperature gradient applied is 600° C. per hour.

Following table 19 summarises the operating conditions and the weights of the raw materials mixed in order to form the cements Cement4, Cement5 and Cement6.

TABLE 19

|  | Cement4 | Cement5 | Cement6 |
|---|---|---|---|
| Alumina Al170 | 720.0 g | 500.0 g | 662.0 g |
| Silica E400 | 35.0 g | 150.0 g | 63.0 g |
| Limestone Normapur | 429.8 g | 614.0 g | 480.7 g |
| Cooking (Duration in hours and temperature in degrees Celsius) | 12 h 1550° C. | 16 h 1525° C. | 16 h 1525° C. |

TABLE 19-continued

|  | Cement4 | Cement5 | Cement6 |
|---|---|---|---|
| Number of revolutions during fin grinding | 7500 | 9000 | 8000 |

Table 20 hereinafter gives the chemical composition of the raw materials used to obtain the laboratory cements Cement4, Cement5, Cement6, as well as the composition of the cements Cement4, Cement5 and Cement6 effectively obtained.

TABLE 20

|  | Source of silica Millisil E400 | Source of alumina Al170 | Source of limestone CaCO$_3$ | Cement4 | Cement5 | Cement6 |
|---|---|---|---|---|---|---|
| PaF (%) | 0.29 | 0.63 | 43.93 | na | na | na |
| SiO$_2$ (%) | 98.51 | na | 0.06 | 3.4 | 15.1 | 6.2 |
| Al$_2$O$_3$ (%) | na | 99.17 | 0.1 | 72.3 | 50.6 | 66.5 |
| Fe$_2$O$_3$ (%) | 0.06 | 0.03 | 0.14 | 1.1 | 0.2 | 0.7 |
| CaO (%) | 0.02 | 0.02 | 55.32 | 24.3 | 34.9 | 27.2 |
| MgO (%) | na | 0.01 | na | na | na | na |
| SO$_3$ (%) | 0.08 | 0.07 | 0.05 | 0.1 | 0.1 | 0.1 |
| K$_2$O (%) | na | na | na | na | na | na |
| Na$_2$O (%) | 0.08 | 0.05 | na | 0.1 | 0.1 | 0 |
| TiO$_2$ (%) | 0.03 | 0.02 | 0.02 | na | na | na |
| P$_2$O$_5$ (%) | 0.01 | 0.01 | na | na | na | na |
| Mn$_2$O$_3$ (%) | 0.01 | 0.01 | 0.01 | na | na | na |
| Cr$_2$O$_3$ (%) | 0.02 | 0.01 | 0.02 | na | na | na |

Table 21 hereinbelow gives the mineralogical phases contained in the fourth, fifth and sixth cements (Cement4, Cement5, Cement6).

TABLE 21

|  | Cement4 | Cement5 | Cement6 |
|---|---|---|---|
| CA (%) | 0 | 0.1 | 0.4 |
| CA6 | 0 | 0 | 0.4 |
| CA2 (%) | 84.8 | 32.6 | 70 |
| C2AS (%) | 15 | 66.9 | 28.8 |
| C2S (%) | 0 | 0 | 0 |
| Ferrites (%) | 0 | 0 | 0 |
| C4A3$ | 0 | 0 | 0 |
| Alumina (%) | 0 | 0.3 | 0.1 |
| Lime (%) | 0.1 | 0.2 | 0.1 |
| Quartz (%) | 0.1 | 0 | 0.2 |
| Other (%) | 0 | 0 | 0 |

The "alumina" and "lime" lines represent the remainder of the raw materials that did not form mineralogical phases.

The cements Cement4, Cement6 and Cement5 are respectively shown in the diagram in FIG. 2 at points J, K and L of the straight line D.

Following table 22 gives the Blaine specific surface area, the density and the diameter d50 (μm) of the cements Cement4, Cement5, Cement6 obtained.

In practice, the density here corresponds to the density of the cement compared to the density of the pure water. The density is measured with a pycnometer.

The diameter d50 corresponds to the median diameter d50 of any set of particles. This is a representative magnitude of the statistic distribution of the sizes of these particles, in other words of the granulometry of this set of particles.

The median diameter d50 is a reference diameter defined as the diameter under which is 50% of the particles studied, in volume in relation to the total volume of all of said particles studied.

In other words, for a set of particles having a given median diameter d50, 50% by volume of these particles has a diameter less than this given median diameter d50, and 50% by weight of these particles have a diameter greater than this given median diameter d50.

"Diameter" here means the largest dimension of the particle, regardless of its shape.

TABLE 22

|  | Blaine Specific Surface Area (cm$^2$/g) | d50(µm) | Density |
|---|---|---|---|
| Cement4 | 3110 | 33 | 2.94 |
| Cement5 | 3690 | 16 | 3.00 |
| Cement6 | 3070 | 25 | 2.95 |

Cementitious compositions were formed using cements according to the invention Cement4, Cement5 and Cement6.

These cementitious compositions were formed at 23° C., by mixing 346 grams of cement with 142 grams of water (i.e. a water/cement ratio of 0.41) for 15 seconds under stirring at 4000 revolutions per minute, then for 35 seconds under stirring at 12,000 revolutions per minute. 2/Rheological Tests The rheological tests were conducted using an Anton Paar viscometer.

As hereinabove, the Anton Paar rheometer used is referenced as MCR_302®. It is provided with a cup CC27 and with a mixing baffle comprising 6 straight rectangular blades 16 millimetres (mm) high over 9 mm long about a shaft 4 mm in diameter.

The change, as a function of time, of the torque generated by the various cementitious compositions on the blade of the viscometer exerting a shear speed of 500 s$^{-1}$, at 80° C. was plotted.

The three cementitious compositions each one comprising the cements Cement4, Cement5 and Cement6 have relatively short gelling times: 7 minutes for the compositions comprising the cements Cement4 and Cement6, and 9 minutes for the composition comprising the cement Cement5. The change, as a function of time of the torque generated by the cementitious composition comprising the cement Cement4 according to the invention on the blade of the viscometer exerting a shear speed of 500s$^{-1}$, was plotted at 80° C. and at 23° C.

At 23° C., the composition undergoes a gelling about 30 minutes after the mixing between the water and the cement Cement4. However, at this temperature, the composition is not subjected to any setting phase in the 8 hours of the experiment.

On the contrary, at 80° C., the setting is relatively fast: the gelling time observed is about 7 minutes followed by a setting phase.

Thus, the reactivity of the composition comprising the cement Cement4 according to the invention is increased by temperature, since the gelling time is shorter and the setting is faster.

3/Bleeding

The bleeding experiment described hereinabove was conducted again on the cementitious compositions comprising the cements Cement4, Cement5, and Cement6 according to the invention.

Following table 23 shows the results of this experiment.

| Cementitious composition | Cement used | Water/cement ratio | Blaine Specific Surface Area (cm$^2$/g) | Water bled (%) |
|---|---|---|---|---|
| Compo17 | Cement4 | 0.41 | 3110 | 0 |
| Compo18 | Cement5 | 0.41 | 3690 | 0.4 |
| Compo19 | Cement6 | 0.41 | 3070 | 0.2 |

One can note that the percentages of bled water are very low and entirely satisfactory to meet the API standards.

4/Density of the Cementitious Compositions

As explained in point 1.8, the density of the cementitious compositions Compo17 to Compo19 was measured. The corresponding results are shown in the following table 24.

TABLE 24

| Cementitious composition | Cement used | Water/cement ratio | Blaine Specific Surface Area (cm$^2$/g) | Density (ppg) |
|---|---|---|---|---|
| Compo17 | Cement4 | 0.41 | 3110 | 16.6 |
| Compo18 | Cement5 | 0.41 | 3690 | 16.4 |
| Compo19 | Cement6 | 0.41 | 3070 | 16.1 |

Thus, one can note that the densities of the cementitious compositions Compo17 to Compo19 according to the invention are similar to that of the Portland reference cement and therefore suited for applications in oil drilling.

5/Hydration and Mechanical Resistance

5a. Ultrasound Test According to Atandard API RP 10B-2

This is a non-destructive test that consists in measuring the propagation time of ultrasounds through a sample of cementitious material, here through the initial slurry, of known dimension, in the process of setting and hardening.

Generally, the more the material hardens, the shorter the time required for the ultrasound to pass through this material is.

Thus, the structuring steps of the material subjected to different chosen conditions of temperature and of pressure can be followed.

This propagation time is then compared to the propagation times obtained with standard test specimens of which the mechanical resistance is evaluated via conventional breakage tests.

It is then possible to deduce the value of the mechanical resistance of the material, referred to as "mechanical resistance by ultrasound", by comparing it with the measurements taken on standard test specimens.

In order to implement this test, it is suitable in a first step to manufacture the cementitious compositions.

In practice, the manufacture of the cementitious compositions is similar to that indicated in part 1.2 of the examples, which corresponds to a manufacture according to the standard API RP 10B-2 Clause 5.

The compositions obtained are those given in tables 23 and 24 hereinabove.

The measurement of the propagation times of the ultrasounds through the sample is carried out according to the standard API RP 10B-2 Clause 8, i.e. water and the cement are mixed, the cementitious composition is introduced into the measuring cell where it is placed under a temperature gradient ranging from 26.6° C. to 121° C. in 4 hours, then under a constant temperature of 121° C. for 20 hours, and where a pressure of 3000 psi is applied as soon as it is introduced into the measuring cell. The mechanical resistance by ultrasound is assessed during the change of the material du to increase in temperature and pressure.

Here, the mechanical resistances of the various cementitious compositions Compo15 and Compo17 to Compo19 are measured 12 hours after the beginning of the thermal treatment, i.e. after the 4 hours of temperature gradient and the first 8 hours of the temperature stage, and 24 hours after the beginning of the thermal treatment, i.e. at the end of the thermal treatment comprising the 4 hours of temperature gradients and the 20 hours of the temperature stage.

The mechanical resistances of the cementitious compositions are as follows after 12 hours of treatment: 34 MegaPascals (MPa) for the Compo17, 1.5 MPa for the Compo18, 17 MPa for the Compo19, and 16 MPa for the Compo15;

after 24 hours of treatment: 34 MPa for the Compo17, 3 MPa for the Compo18, 19 MPa for the Compo19 and 21 MPa for the Compo15.

As these results show, the composition Compo19 comprising the Cement6 manufactured in the laboratory has a mechanical resistance by ultrasound that is comparable to that of the composition Compo15 comprising the Cement3bis manufactured industrially, as these cements have an equivalent content in phase CA2 and C2AS.

Moreover, it can be noted that the mechanical resistance by ultrasound of the composition Compo14 comprising the Cement4 is clearly greater than the mechanical resistance of the composition Compo19 comprising the Cement6which itself is clearly greater than the mechanical resistance of the composition Compo18 comprising the Cement5.

Consequently, it can be deduced that the mechanical resistance by ultrasound increases with the mass ratio CA2/C2AS of the cements used.

However, the mechanical resistance of the composition Compo18 comprising the Cement5 is still very low, the hydration of the corresponding composition probably not being sufficiently advanced at the time of the measurement (24 hours).

5b. Autoclave Test

The cementitious compositions are carried out according to the same protocol as for the tests in the Anton Paar viscometer.

The cementitious compositions were introduced into a mould comprising three cylindrical cells (diameter 40 mm, height 50 mm), then placed in the autoclave set to 180° C. with a pressure of 10 bars (145 PSI) generated by the vapour pressure.

After 24 hours of residence in the autoclave, the resistance to compression of the cementitious compositions is measured by means of a press module. The compression speed is 2.4 kiloNewtons per second.

The composition Compo17 comprising the cement Cement4 has a mechanical resistance to compression of 2113 PSI (14.6 MPa), that comprising the cement Cement5 (Compo18) of 561 PSI (3.9 MPa), and that comprising the cement Cement6 (Compo19) of 2330 PSI (16.0 MPa).

Then after a cure under a temperature of 120° C., such as undergone during the test carried out by using ultrasound described hereinabove, the composition Compo18 comprising the cement Cement5 according to the invention developed a mechanical resistance by ultrasound equal to 10% of that of the composition Compo17 comprising the cement Cement4, the mechanical resistance of this same composition Compo18 comprising the Cement5 after a treatment at 180° C. in the autoclave is equal to 25% of that comprising the Cement4 (Compo17).

Thus, the higher the temperature is, the more the difference in the mechanical resistance between the cementitious composition comprising a cement according to the invention rich in C2AS and the cementitious composition comprising a cement according to the invention rich in CA2 tends to be reduced.

The cements according to the invention are intended for different applications for which a more or less great resistance is sought, at a given time.

III Effects of the Minority Phase Ye'elimite C4A3$

1/Cements Compared

Moreover, three other cements Cement7, Cement8, Cement9 were also manufactured.

These are cements manufactured in the laboratory and intended to reproduce the cements obtained industrially by the method according to the invention, when the raw materials used contain sulphur oxide $SO_3$, or when the sulphur oxide is introduced by the industrial method.

In practice, the cements Cement7, Cement8, Cement9 are obtained from the following raw materials: limestone, bauxite A, bauxite B and anhydrous calcium sulphate (shortened to C$), of which the respective chemical compositions are indicated in table 26 hereinafter.

In practice, 5 kg of each one of the cements Cement7, Cement8 and Cement9 are obtained according to the following operating procedure:

Steaming of the raw materials at 110° C. for 24 hours in order to dry them;

Co-grinding of the raw materials in a laboratory ball mill of the "Blue Circle" type, at 1500 revolutions, followed by the opening of the mill in order to clean the trap and an additional grinding for an additional 400 revolutions.

Granulation of the raw materials with water according to a technique known to those skilled in the art referred to as "disc granulation" in order to obtain granules from about 5 mm to 20 mm in diameter;

Steaming of the granules at 110° C. for 24 hours in order to dry them;

Cooking of the granules in three crucibles made of alumina, in an oven of the brand Nabertherm® at 1375° C. for 12 hours (once the temperature of 1.375° C. is reached) with a rise in the temperature gradient of 10° C. per minute;

Cooling via inertia in the oven;

Grinding of the material obtained in order to form grains with a diameter smaller than 3.15 mm;

Fin grinding of the grains obtained in the ball mill of the "Blue Circle" type until a powder with a Blaine specific surface area of about 3000 $cm^2/g$ is obtained.

Following table 25 summarises the operating conditions and the weights of the raw materials mixed in order to form the cements Cement7, Cement8 and Cement9.

TABLE 25

|  | Cement7 | Cement8 | Cement9 |
| --- | --- | --- | --- |
| Limestone (g) | 34 | 34 | 33.4 |
| Bauxite A (g) | 58.6 | 58.6 | 58.2 |
| Bauxite B (g) | 7 | 6 | 6 |
| Anhydrite C$ (g) | 0.4 | 1.4 | 2.4 |
| Cooking (Duration in hours and temperature in degrees Celsius) | A stage of 12 hours at 1375° C., with a temperature gradient of 600° C. per hour. | | |

Table 26 hereinafter gives the chemical composition of the raw materials used to obtain the cements Cement7, Cement8, Cement9 as well as that of the cements Cement7, Cement8, Cement9 obtained.

TABLE 26

|  | Lime-stone | Bauxite A | Bauxite B | Cement 7 | Cement 8 | Cement 9 |
|---|---|---|---|---|---|---|
| SiO2 (%) | 0.13 | 7.66 | 0.93 | 6.5 | 4.9 | 4.9 |
| Al2O3 (%) | 0.29 | 68.86 | 77.80 | 64.3 | 66.0 | 64.0 |
| Fe2O3 (%) | 0.10 | 2.36 | 0.61 | 0.4 | 0.4 | 0.5 |
| CaO (%) | 56.21 | 0.54 | 0.02 | 25.9 | 25.7 | 26.0 |
| MgO (%) | 0.11 | 0.27 | 0.08 | 0.2 | 0.4 | 0.4 |
| SO3 (%) | 0.05 | 0.12 | 0.07 | 0.2 | 0.6 | 1.1 |
| K2O (%) | 0.00 | 0.87 | 0.05 | na | na | na |
| Na2O (%) | 0.05 | 0.09 | 0.19 | na | na | na |
| TiO2 (%) | 0.02 | 3.57 | 4.45 | 2.4 | 3.0 | 2.9 |
| P2O5 (%) | 0.01 | 0.21 | 0.17 | na | na | na |
| Mn2O3 (%) | 0.01 | 0.03 | 0.01 | na | na | na |
| Cr2O3 (%) | 0.01 | 0.03 | 0.02 | na | na | na |
| FeO | na | na | na | 0.1 | 0.1 | 0.1 |
| H2O | na | na | na | 0 | 0 | 0 |
| LOI (%) | 43.02 | 15.39 | 15.61 | na | na | na |

Table 27 hereinbelow gives the mineralogical phases contained in the cements Cement7, Cement8, Cement9. The mineralogical phases were measured using a known technique of X-ray diffraction (often shortened to DRX).

TABLE 27

|  | Cement7 | Cement8 | Cement9 |
|---|---|---|---|
| CA2 | 54 | 60 | 54 |
| C2AS | 30 | 23 | 22 |
| CA6 | 9 | 7 | 8 |
| CT ortho | 4 | 5 | 5 |
| C4A3$ | 1 | 4 | 8 |
| MA | 1 | 1 | 1 |
| CA | 0 | 0 | 0 |
| Ferrite | 1 | 0 | 1 |

The phase MA corresponds to a phase comprising one molecule of magnesium oxide MgO (noted as M according to cement-manufacturer notation) for one molecule of alumina A.

Each one of the cements Cement7, Cement8, Cement9 comprises about 70% of the first mineralogical phase CA2 and 30% of the second mineralogical phase C2AS, with respect to the total weight of these two mineralogical phases.

Thus, they are equivalent, in terms of composition in these two phases, to the cements Cement3, Cement3bis and Cement6 according to the invention.

As can be seen in table 27, the cements Cement7, Cement8 and Cement9 include various proportions of the minority phase Ye'elimite C4A3$, namely respectively 1%, 4% and 8% of mineralogical phase C4A3$, by weight with respect to the total weight of the calcium aluminate cement, respectively Cement7, Cement8 and Cement9.

Thus, the proportions in mineralogical phases of the Cement8 make it similar to the calcium aluminate cements according to the invention Cement3 and Cement3bis.

Table 28 gives the Blaine specific surface area and the diameter d50 (μm) of the cements Cement7, Cement8 and Cement9 obtained

TABLE 28

|  | Blaine Specific Surface Area (cm$^2$/g) | d50(μm) |
|---|---|---|
| Cement7 | 2950 | 34 |
| Cement8 | 3000 | 28 |
| Cement9 | 3080 | 24 |

Cementitious compositions were formed using cements according to the invention Cement7, Cement8 and Cement9.

These cementitious compositions were formed at 23° C., by mixing 346 grams of cement with 152 grams of water (i.e. a water/cement ratio of 0.44) for 15 seconds under stirring at 4000 revolutions per minute, then for 35 seconds under stirring at 12,000 revolutions per minute.

2/Rheological Tests

2a. Fann®35 Viscometer

As explained hereinabove in the part I. Preliminary tests, thanks to the FANN®35 viscometer, it is possible to follow the change of the torque generated by the cementitious composition on the inner sleeve, according to the rotation speed of the outer cylinder, and to test on a one-off basis the cementitious composition in order to estimate its viscosity directly after the mixing between the cement and the water (Initial viscosity V1), or after a rest period of 10 minutes (Viscosity V2), at a temperature of 23° C.

Table 29 shows the values of the angle of torsion of the retaining spring linked to the inner sleeve that are representative of the viscosity V1 and V2 of the cementitious compositions comprising the cements Cement7, Cement8, Cement9, as well as those of the cementitious compositions comprising the cement Cement3bis.

TABLE 29

| Cementitious composition | Cement used | Water/cement ratio | Blaine Surface (cm$^2$/g) | Phase C4A3$ (%) | Viscosity V1 | Viscosity V2 |
|---|---|---|---|---|---|---|
| Compo15 | Cement3bis | 0.41 | 3070 | 4 | 17 | 38 |
| Compo16 | Cement3bis | 0.48 | 3070 | 4 | 9 | 25 |
| Compo20 | Cement7 | 0.44 | 2950 | 1 | 13 | 32 |
| Compo21 | Cement8 | 0.44 | 3000 | 4 | 15 | 46 |
| Compo22 | Cement9 | 0.44 | 3080 | 8 | 17 | 58 |

As such, as shown in table 29, the viscosities V1 and V2 of the cementitious compositions 20 to 22 comprising the cements Cement7, Cement8, Cement9 are satisfactory as they allow for the pumping of these cementitious compositions at ambient temperature.

At 23° C., the viscosities V1 and V2 are slightly affected by the percentage of the minority phase Ye'elimite C4A3$: the viscosities V1 and V2 increase with the increase of the phase Ye'elimite.

The following table 30 gives the viscosity of the various cementitious compositions Compo16 and Compo20 to Compo22, at 23° C., when the outer cylinder of the rheometer is rotating at 300 revolutions per minute (in the process of increasing) then at 600 revolutions per minute.

TABLE 30

| Cementitious composition | Cement used | Water/cement ratio | Blaine Surface (cm²/g) | Phase C4A3$ (%) | Viscosity at 300 revolutions per minute |
|---|---|---|---|---|---|
| Compo16 | Cement3bis | 0.48 | 3070 | 4 | 62 |
| Compo20 | Cement7 | 0.44 | 2950 | 1 | 75 |
| Compo21 | Cement8 | 0.44 | 3000 | 4 | 100 |
| Compo22 | Cement9 | 0.44 | 3080 | 8 | 103 |

Again, it can be noted that at 23° C., the viscosity under high stress is slightly affected by the percentage of the minority phase Ye'elimite C4A3$: the viscosity increases with the increase of the phase Ye'elimite.

2b. Anton Paar Viscometer

As explained hereinabove, the Anton Paar viscometer makes it possible to follow the change of the viscosity as a function of time, at a given temperature, when the blade is rotating at a chosen speed.

Here, the propeller rotates at $500s^{-1}$, and the temperature is about 80° C.

Thanks to the curve obtained, it is possible to go back to the beginning of the setting, namely the so-called "gelling" time corresponding to the location of the change in the slope of the curve.

The change as a function of time of the torque generated by the cementitious compositions Compo20 to Compo22 on the blade of the Anton Par rheometer, at 80° C. was measured.

The effect of the minority phase Ye'elimite C4A3$ is substantial at 80° C., on the gelling time (which marks the beginning of the setting phase) as well as on the overall viscosity of the compositions.

Indeed, the gelling times are respectively about 30 minutes for the composition Compo20 comprising 1% of phase C4A3$, 5 hours and 20 minutes for the composition Compo21 comprising 4% of phase C4A3$, and 6 hours and 30 minutes for the composition Compo22 comprising 8% of phase C4A3$.

Thus, surprisingly, the more the quantity of the minority phase Ye'elimite increases in the cementitious composition, the greater the workability is, i.e. the longer the open time is, or the longer the thickening phase is.

Consequently, it seems that the minority phase C4A3$ has a retardant effect, at high temperature, on the setting of the cementitious compositions according to the invention.

Furthermore, the shearing stresses at $500\ s^{-1}$ (linked to the dynamic viscosity) of the cementitious compositions during the thickening phase are all the more large that the cementitious compositions include more of the minority phase C4A3$: 150 Pa for the Compo20, around 250 Pa for the Compo21, and around 500 Pa for the Compo22.

Thus, at 80° C., the dynamic viscosity of the cementitious compositions for the thickening phase seems to be highly affected by the increase of the minority phase Ye'elimite.

3/Bleeding

The bleeding experiment described hereinabove was conducted again on the cementitious compositions comprising the cements according to the invention Cement7, Cement8, and Cement9.

Table 31 shows the results of this experiment.

TABLE 31

| Cementitious composition | Cement used | Water/cement ratio | Blaine Specific Surface Area (cm²/g) | Water bled (%) |
|---|---|---|---|---|
| Compo20 | Cement7 | 0.44 | 2950 | 0.3 |
| Compo21 | Cement8 | 0.44 | 3000 | 1.1 |
| Compo22 | Cement9 | 0.44 | 3080 | 0.7 |

One can note that the percentages of water bled are very low and entirely satisfactory to meet the API standards.

4/Density

As explained in point 1.8, the density was measured of the cementitious compositions Compo20 to Compo22. The results are shown in following table 32.

TABLE 32

| Cementitious composition | Cement used | Water/cement ratio | Blaine Specific Surface Area (cm²/g) | Specific Density (ppg) |
|---|---|---|---|---|
| Compo20 | Cement7 | 0.44 | 2950 | 15.8 |
| Compo21 | Cement8 | 0.44 | 3000 | 15.5 |
| Compo22 | Cement9 | 0.44 | 3080 | 15.6 |

As such, note that the densities of the cementitious compositions Compo20 to Compo22 according to the invention are suited for an application in oil drilling.

The presence of the minority phase C4A3$ therefore does not have any impact on the density of the cementitious compositions according to the invention.

5/Cross-Pollution

As explained hereinabove in point I.6b, the effect of the contamination of a Portland cement by a cement according to the invention, or of the contamination of a cement according to the invention by a Portland cement was evaluated thanks to the Anton Paar viscometer.

Recall that the corresponding gelling time is measured at the moment of the change in the slope of the curve (representing the passage of the thickening phase to the setting phase), and the setting time which corresponds to the duration that elapses between the formation of the cementitious composition and the moment when the torque reaches 4 mN.m.

For this measurement, the cementitious compositions are prepared as follows: 100 g of cement is mixed with 44 g of water (i.e. a water/cement ratio of 0.44), using a Rayneri Turbotest mixer, for 15 seconds at 1000 revolutions per minute, then for 120 seconds at 3300 revolutions per minute.

Table 33 hereinbelow shows the results obtained.

TABLE 33

| Cements used | | | Phase C4A3$ in the mixture Cement3bis + | Time measured 20° C. | |
|---|---|---|---|---|---|
| CementRef (%) | Cement3bis (%) | CSA (%) | CSA (%) | Gelling (min) | Setting (min) |
| 25 | 69 | 6 | 8% | 240 | 280 |
| 25 | 75 | 0 | 4% | 190 | 260 |

The cement CSA corresponds to a conventional sulfocalcium aluminate cement that can be found off the shelf.

This can be for example cement KTS 100 marketed by the company Polar Bear, having a Blaine specific surface area of 4900 cm²/g. This commercial cement comprises about 55% of phase C4A3$, by weight with respect to the total weight of the cement.

The adding of sulfocalcium aluminate cement makes it possible to introduce a given quantity of phase C4A3$ in the cementitious composition and to assess the effect of this phase on the pollution of a Portland cement by a cement according to the invention and inversely.

Here, the mixture of cement Cement3bis according to the invention and of cement CSA comprises about 8% of phase C4A3$, by weight with respect to the total weight of said cement mixture. This mixture of cements undergoes a pollution by the Portland cement of about 25%, or pollutes a Portland cement, by about 25%.

When the mixture of cement is polluted by Portland cement, it is noted that the gelling and setting times are clearly longer and pass from 190 minutes and 260 minutes to 240 minutes and 280 minutes.

Thus, the increase in the minority phase C4A3$ makes it possible to further decrease the effect of the pollution of a cement according to the invention by a Portland cement.

Consequently, it is not necessary to clean the installations between a use of a cement according to the invention and a use of a Portland cement.

The invention claimed is:

1. Calcium aluminate cement, comprising a calcium aluminate with a first crystallised mineralogical phase of calcium dialuminate CA2 comprising one calcium oxide CaO for two aluminium oxides $Al_2O_3$ and a second crystallised mineralogical phase of dicalcium alumina silicate C2AS comprising two calcium oxides CaO for one aluminium oxide $Al_2O_3$ and one silicon dioxide $SiO_2$,
   wherein the mass fraction of all of said first and second mineralogical phases in said calcium aluminate is greater than or equal to 80%, and
   wherein said calcium aluminate further comprises an additional mineralogical phase of sulfocalcium aluminate C4A3$ comprising four calcium oxides CaO for three aluminium oxides $Al_2O_3$ and one sulphur oxide $SO_3$.

2. The calcium aluminate cement according to claim 1, wherein said calcium aluminate also comprises an amorphous portion, of which the mass fraction in said calcium aluminate is less than or equal to 20%.

3. The calcium aluminate cement according to claim 1, wherein said calcium aluminate further comprises a third crystallised mineralogical phase of monocalcium aluminate CA comprising one calcium oxide CaO for one aluminium oxide $Al_2O_3$ and/or a fourth crystallised mineralogical phase of hexa-calcium aluminate CA6 comprising one calcium oxide CaO for six aluminium oxides $Al_2O_3$, the mass fraction of all of the third and fourth mineralogical phases in said calcium aluminate being less than or equal to 20%.

4. The calcium aluminate cement, according to claim 1, comprising, by weight with respect to the total weight of said calcium aluminate:
   0% to 5% of an iron oxide $Fe_2O_3$,
   0% to 5% of a titanium oxide $TiO_2$,
   0% to 5% of a sulphur oxide $SO_3$,
   0% to 5% of a magnesium oxide MgO,
   0% to 2% of alkaline compounds.

5. The calcium aluminate cement according to claim 1, having the form of a powder that has a Blaine specific surface area measured according to standard NF-EN-196-6 ranging between 2200 square centimetres per gram and 4500 square centimetres per gram.

6. The calcium aluminate cement according to claim 1, comprising, by weight with respect to the total weight of said calcium aluminate:
   50% to 60% of first crystallised mineralogical phase CA2,
   26% to 32% of second crystallised mineralogical phase C2AS,
   2.5% to 3.5% of third crystallised mineralogical phase CA,
   0.5% to 1.5% of a fifth crystallised mineralogical phase of tetracalcium ferro-aluminate C4AF,
   10% to 15% of additional crystallised mineralogical phases.

7. The calcium aluminate cement according to claim 1, comprising 0.5% to 15% of additional mineralogical phase of sulfocalcium aluminate C4A3$ by weight with respect to the total weight of said calcium aluminate.

8. Cementitious composition comprising at least the calcium aluminate cement of claim 1 mixed with water.

9. The cementitious composition of claim 8, further comprising at least one additive material selected from a group consisting of: fly ash, granulated blast furnace slag, a silica flour, a silica fume, a metakaolin, granulates, and sand.

10. The cementitious composition of claim 8, further comprising granulated blast furnace slag.

11. The cementitious composition of claim 8, further comprising silica flour.

12. The cementitious composition of claim 8, further comprising silica fume.

13. The cementitious composition of claim 8, further comprising metakaolin.

14. The cementitious composition of claim 8, further comprising quartz granulates.

15. A method for utilizing cement based on the calcium aluminate cement of claim 1, comprising steps of:
   a) realizing a cementitious composition by mixing at least said calcium aluminate cement with water,
   b) setting said cementitious composition in place,
   c) heating said cementitious composition to a temperature ranging between 50° C. and 300° C., in such a way as to favour the setting of the cementitious composition.

16. The method of claim 15, wherein, in the step a), the cementitious composition has the form of an aqueous suspension, and according to which in the step b), the cementitious composition is placed in an oil drilling well.

17. The calcium aluminate cement according to claim 1, having the form of a powder that has a Blaine specific surface area measured according to standard NF-EN-196-6 ranging between 2900 and 3900 square centimetres per gram.

18. A method for utilizing cement based on the calcium aluminate cement of claim 1, comprising steps of:
   a) realizing a cementitious composition by mixing at least said calcium aluminate cement with water,
   b) setting said cementitious composition in place,
   c) heating said cementitious composition to a temperature ranging between 80° C. and 280° C., in such a way as to favour the setting of the cementitious composition.

* * * * *